US012495264B2

(12) United States Patent
Kucuk et al.

(10) Patent No.: US 12,495,264 B2
(45) Date of Patent: Dec. 9, 2025

(54) SYSTEM AND/OR METHOD FOR LOUDSPEAKER AUTO CALIBRATION AND LOUDSPEAKER CONFIGURATION LAYOUT ESTIMATION

(71) Applicant: Harman International Industries, Incorporated, Stamford, CT (US)

(72) Inventors: Abdullah Kucuk, Novi, MI (US); Kadagattur Srinidhi, Novi, MI (US); Kevin J. Bastyr, Franklin, MI (US)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 236 days.

(21) Appl. No.: 18/204,150

(22) Filed: May 31, 2023

(65) Prior Publication Data

US 2024/0406655 A1 Dec. 5, 2024

(51) Int. Cl.

| | |
|---|---|
| ***H04S 7/00*** | (2006.01) |
| ***H04R 5/02*** | (2006.01) |
| ***H04R 5/027*** | (2006.01) |
| ***H04R 5/04*** | (2006.01) |

(52) U.S. Cl.

CPC ............... *H04S 7/301* (2013.01); *H04R 5/02* (2013.01); *H04R 5/027* (2013.01); *H04R 5/04* (2013.01); *H04S 2400/15* (2013.01)

(58) Field of Classification Search

CPC ....... H04S 7/301; H04S 2400/15; H04R 5/02; H04R 5/027; H04R 5/04

See application file for complete search history.

(56) References Cited

U.S. PATENT DOCUMENTS

| | | | |
|---|---|---|---|
| 9,270,807 | B2 | 2/2016 | Shivappa et al. |
| 9,360,546 | B2 | 6/2016 | Kim et al. |
| 9,794,720 | B1 | 10/2017 | Kadri |

(Continued)

FOREIGN PATENT DOCUMENTS

| | | | |
|---|---|---|---|
| EP | 2429214 | A2 | 3/2012 |
| WO | 2022118072 | A1 | 6/2022 |

OTHER PUBLICATIONS

Liang, S. et al., "The Optimal Ratio Time-Frequency Mask for Speech Separation in Terms of the Signal-to-Noise Ratio", The Journal of the Acoustical Society of America 134, Oct. 16, 2013, 8 pgs.

(Continued)

*Primary Examiner* — Andrew Sniezek
(74) *Attorney, Agent, or Firm* — BROOKS KUSHMAN P.C.

(57) ABSTRACT

An audio system is provided. The audio system includes a plurality of loudspeakers and a mobile device. The plurality of loudspeakers is capable of being positioned in a listening environment and being arranged to transmit an audio signal in the listening environment. Each loudspeaker is programmed to determine angle information of the audio signal as received at the loudspeaker relative to other loudspeakers of the plurality of loudspeakers and to transmit a first signal indicative of the angle information. The mobile device is programmed to receive the first signal from each of the loudspeakers and to determine a location for each loudspeaker in the listening environment based at least on the angle information.

17 Claims, 26 Drawing Sheets

(56) References Cited

U.S. PATENT DOCUMENTS

| | | | | |
|---|---|---|---|---|
| 10,299,060 | B2 | 5/2019 | Satheesh et al. | |
| 10,598,543 | B1 | 3/2020 | Mansour et al. | |
| 11,545,172 | B1 | 1/2023 | Chu | |
| 11,567,162 | B2 | 1/2023 | Chen et al. | |
| 12,081,949 | B2 | 9/2024 | Vetter et al. | |
| 2005/0254662 | A1 | 11/2005 | Blank et al. | |
| 2013/0156198 | A1* | 6/2013 | Kim | G01S 3/808<br>381/17 |
| 2017/0094437 | A1 | 3/2017 | Kadri et al. | |
| 2019/0228790 | A1 | 7/2019 | Park et al. | |
| 2019/0253801 | A1 | 8/2019 | Arteaga et al. | |
| 2021/0116555 | A1 | 4/2021 | Zaccá | |
| 2022/0291328 | A1 | 9/2022 | Ozturk et al. | |
| 2023/0040846 | A1 | 2/2023 | Thomas et al. | |
| 2023/0162750 | A1 | 5/2023 | Murgai et al. | |
| 2024/0381046 | A1 | 11/2024 | Thomas et al. | |

OTHER PUBLICATIONS

Xia, S. et al., "Using Optimal Ratio Mask as Training Target for Supervised Speech Separation", In 2017 Asia-Pacific Signal and Information Processing Association Annual Summit and Conference (APSIPA ASC), Sep. 11, 2017, 5 pgs.

Knapp, C. et al., "The generalized correlation method for estimation of time delay", IEEE transactions on acoustics, speech, and signal processing, Aug. 1976, 8 pgs.

Extended European Search Report dated Oct. 17, 2024 for European Patent Application No. 24175735.0, 8 pages.

Extended European Search Report dated Oct. 15, 2024 for European Patent Application No. 24175717.8, 9 pages.

Extended European Search Report dated Nov. 4, 2024 for European Patent Application No. 24175728.5, 9 pages.

Non-Final Office Action; related U.S. Appl. No. 18/204,159, filed May 31, 2023; date of mailing Apr. 1, 2025, 16 pgs.

* cited by examiner

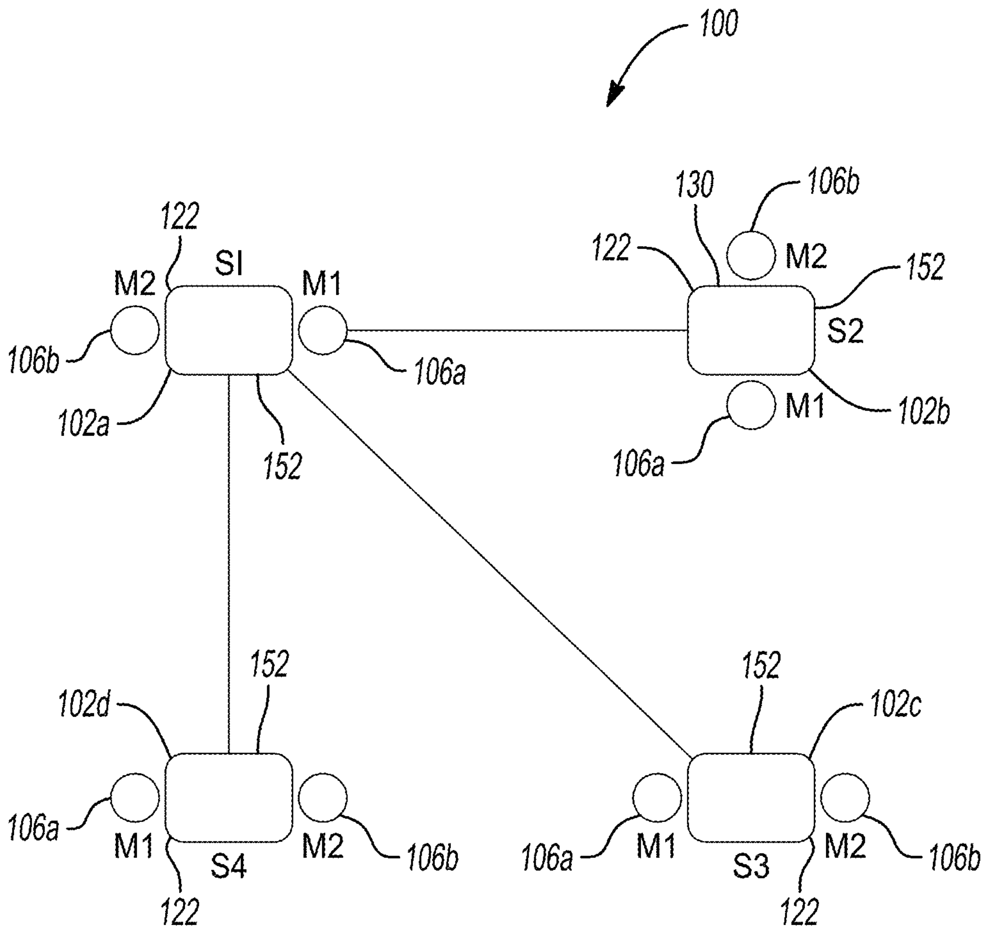
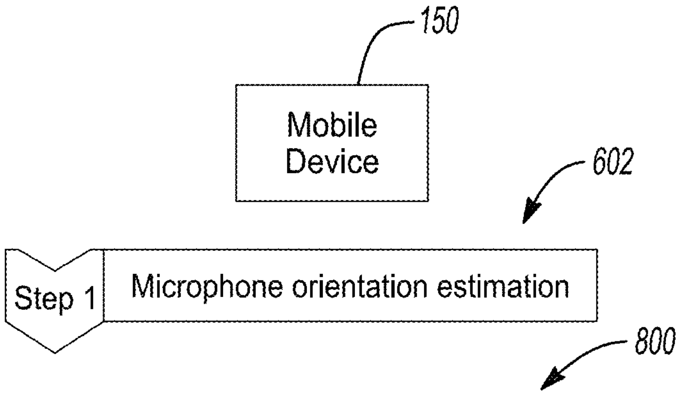
800
$$DOA = \begin{bmatrix} \square & S1 & S2 & S3 & S4 \\ S1 & -360 & 0 & 45 & 90 \\ S2 & 90 & -360 & 0 & 45 \\ S3 & 45 & 90 & -360 & 0 \\ S4 & 90 & 135 & 180 & -360 \end{bmatrix}$$
A two speaker location in space establishes a line and the slope of the line doesn't change when viewed from one speaker or another one.
Fig-8

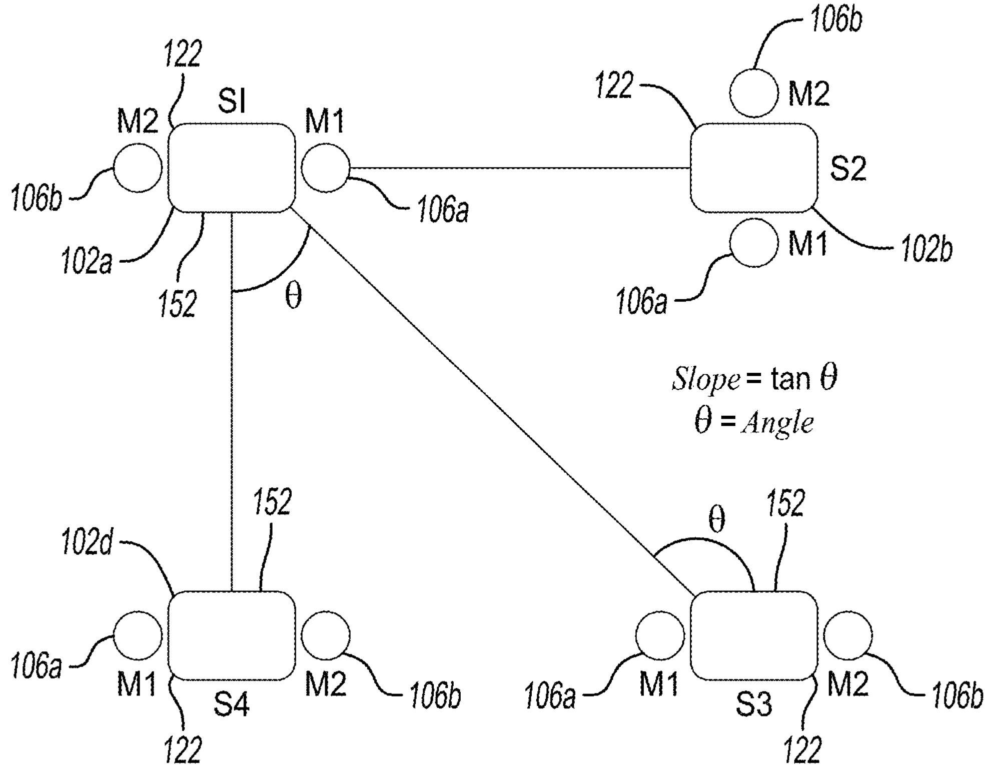

150 Mobile Device

604

Step 1 Outlier Detection - 2nd Example

902

$$DOA = \begin{bmatrix} \square & S1 & S2 & S3 & S4 \\ S1 & -360 & 0 & 45 & 90 \\ S2 & 0 & -360 & 25 & 135 \\ S3 & 45 & 90 & -360 & 0 \\ S4 & 90 & 135 & 180 & -360 \end{bmatrix}$$

The method checks the differences of interdevices' DOA estimations. If the difference is higher than determined threshold, there is an outlier.

1100

$$isBlocked = \begin{bmatrix} \square & S1 & S2 & S3 & S4 \\ S1 & -360 & 0 & 0 & 0 \\ S2 & 0 & -360 & 1 & 0 \\ S3 & 0 & 1 & -360 & 0 \\ S4 & 0 & 0 & 0 & -360 \end{bmatrix}$$

Fig-12

| | Candidate X for S3 | Candidate Y for S3 |
|---|---|---|
| S1 | 70.71 | 70.71 |
| S2 | 100 | -100 |
| S4 | 100 | -100 |

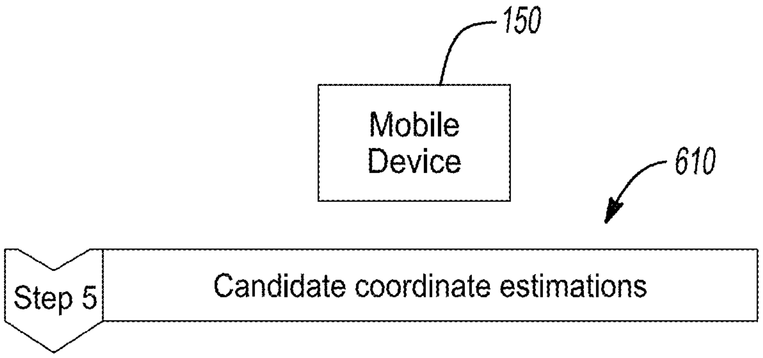

*Coordinate Calculation using angle and distance*

$$(x, y)$$

$$(x_{si} + distance_{sisj} * cos(DOA_{sisj}), y_{si} - distance_{sisj} * sin(DOA_{sisj}))$$

*Example of calculating coordinates for speakers3*

$$(x_{31}, y_{31}) = (0 + 100 * \cos(45), 0 - 100 * \sin(45)) = (70.71, -70.71)$$

$$(x_{32}, y_{32}) = (100 + 100 * \cos(90), -100 * \sin(90)) = (100, -100)$$

$$(x_{34}, y_{34}) = (0 + 100 * \cos(180), -100 - 100 * \sin(180)) = (-100, -100)$$

902

$$DOA = \begin{bmatrix} \square & S1 & S2 & S3 & S4 \\ S1 & -360 & 0 & 45 & 90 \\ S2 & 0 & -360 & 90 & 135 \\ S3 & 45 & 90 & -360 & 0 \\ S4 & 90 & 135 & 180 & -360 \end{bmatrix}$$

| | Candidate X for S3 | Candidate Y for S3 |
|---|---|---|
| S1 | 70.71 | 70.71 |
| S2 | 100 | -100 |
| S4 | -100 | -100 |

Fig-17

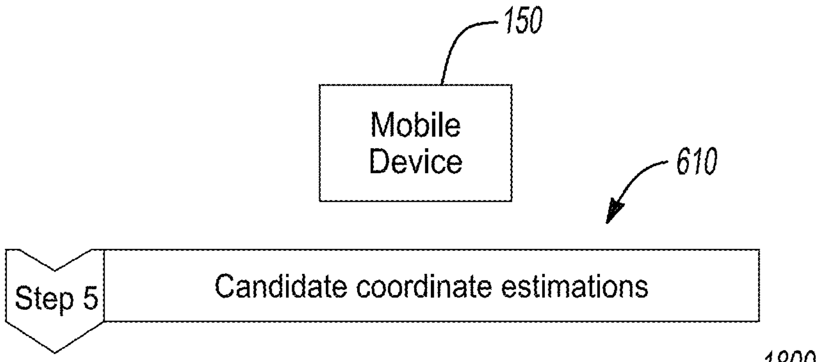
1800
| | Candidate X for S3 | Candidate Y for S3 | Remark |
|---|---|---|---|
| S1 | 70.71 | -70.71 | $(x_a, y_a)$ |
| S2 | 100 | -100 | $(x_b, y_b)$ |
| S4 | -100 | -100 | $(x_c, y_c)$ |
| S1&S2 | 70.71 | -100 | $(x_a, y_b)$ |
| S4&S1 | -100 | -70.71 | $(x_c, y_a)$ |
| S2&S1 (Angle) | 100 | -100 | Use angle and $(x_b, y_b)$ |
1600 1802 1804
Candidate coordinates are extended by combining candidate x and y points
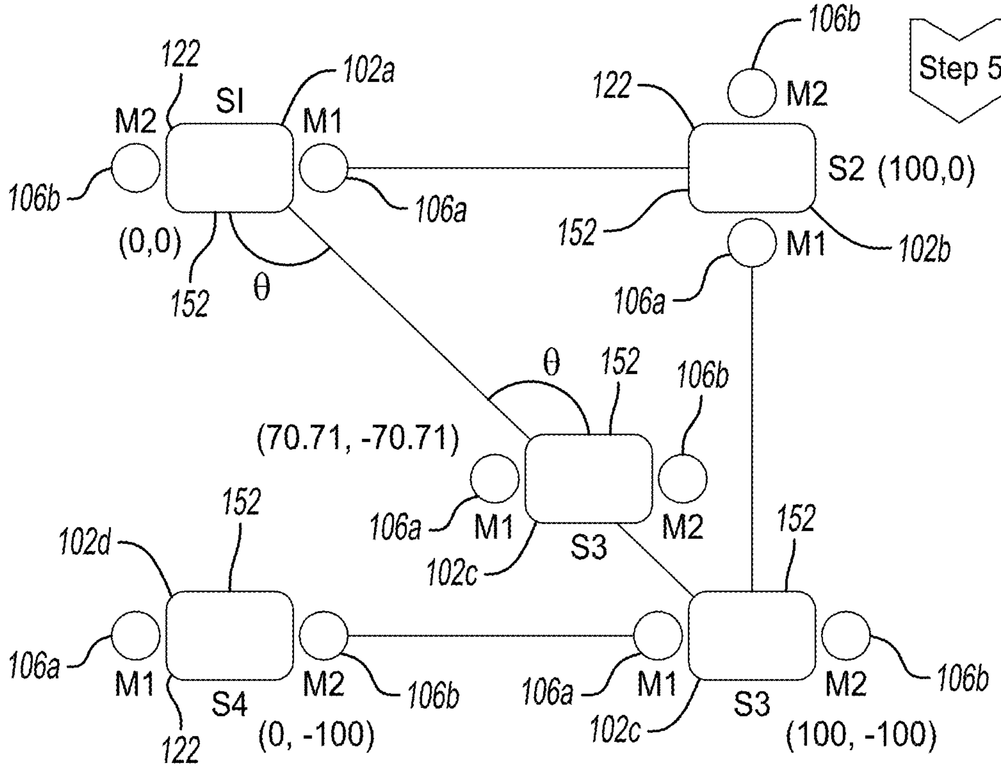
Fig-18

| | Candidate X for S3 | Candidate Y for S3 |
|---|---|---|
| S1 | 70.71 | -70.71 |
| S2 | 100 | -100 |
| S4 | 100 | -100 |
| S1-S2 | 70.71 | -100 |
| S4-S1 | 100 | -70.71 |
| S2-S1 (Angle) | 100 | -100 |

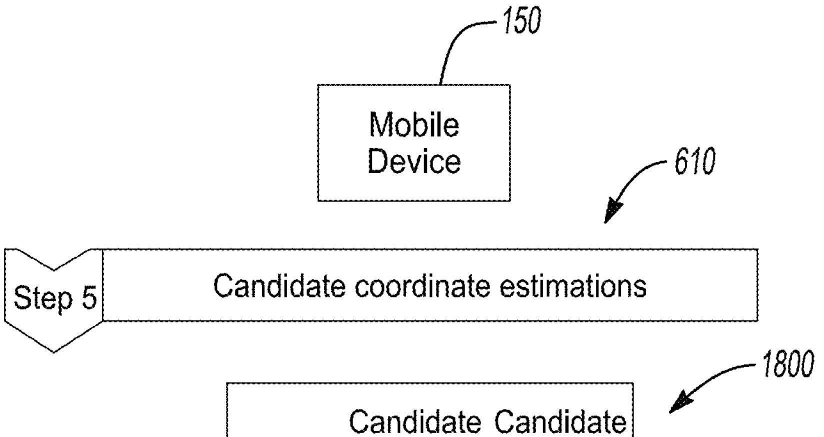

1800

| | Candidate X for S3 | Candidate Y for S3 |
|---|---|---|
| S1 | 70.71 | -70.71 |
| S2 | 100 | -100 |
| S1&S2 | 70.71 | -100 |
| S2&S1 | 100 | -70.71 |
| S2-S1 (Angle) | 100 | -100 |

1600 (S1, S2); 1802 (S1&S2, S2&S1); 1804

In one embodiment, the method may tolerate 1 outlier between two devices for a 4 speaker case. The method raises an error if there is 1 or more outliers between the devices for 2 & 3 speaker case.

800'

$$DOA = \begin{bmatrix} [\,] & S1 & S2 & S3 & S4 \\ S1 & -360 & 0 & 45 & 90 \\ S2 & 90 & -360 & 0 & 45 \\ S3 & 45 & 90 & -360 & 0 \\ S4 & 90 & 135 & 145 & -360 \end{bmatrix}$$

1100'

$$isBlocked = \begin{bmatrix} [\,] & S1 & S2 & S3 & S4 \\ S1 & -360 & 0 & 0 & 0 \\ S2 & 0 & -360 & 0 & 0 \\ S3 & 0 & 1 & -360 & 0 \\ S4 & 0 & 0 & 1 & -360 \end{bmatrix}$$

Fig-20

612

Step 6 Best coordinates selection $$\hat{\theta}_{ic} = \frac{y_c - y_i}{x_c - x_i}$$

Error31 = |45-45| + |90-150| + |0-20| = 80

Error32 = |45-45| + |0-0| + |180-180| = 0

| | Candidate X for S3 | Candidate Y for S3 | $\theta_{3C}$ |
|---|---|---|---|
| S1 | 70.71 | -70.71 | S1-S3:45<br>S3-S2:150<br>S3-S4: 20 |
| S2 | 100 | -100 | S1-S3:45<br>S3-S2:0<br>S3-S4: 180 |
| S1-S2 | 70.71 | -100 | |
| S4-S1 | 100 | -70.71 | |
| S4-S1 (Angle) | 100 | -100 | |

1600 (rows S1–S2), 1802 (rows S1-S2, S4-S1), 1804 (row S4-S1 (Angle))

Fig-22

SYSTEM AND/OR METHOD FOR LOUDSPEAKER AUTO CALIBRATION AND LOUDSPEAKER CONFIGURATION LAYOUT ESTIMATION

CROSS-REFERENCE TO RELATED APPLICATIONS

This application generally relates to the U.S. application Ser. No. 18/204,165, filed May 31, 2023, entitled "BOUNDARY DISTANCE SYSTEM AND METHOD" the disclosure of which is hereby incorporated in its entirety by reference herein.

This application generally relates to the U.S. application Ser. No. 18/204,159, filed May 31, 2023, entitled "APPARATUS, SYSTEM AND/OR METHOD FOR NOISE TIME-FREQUENCY MASKING BASED DIRECTION OF ARRIVAL ESTIMATION FOR LOUDSPEAKER AUDIO CALIBRATION" the disclosure of which is hereby incorporated in its entirety by reference herein.

TECHNICAL FIELD

Aspects disclosed herein generally relate to an apparatus, system, and/or method for noise—robust time-frequency masking-based direction of arrival estimation for loudspeaker audio calibration. These aspects and others will be discussed in more detail herein.

BACKGROUND

Various loudspeaker manufacturers or providers may bring together various loudspeaker categories to form one ecosystem. In this regard, various loudspeakers communicate or work with one another and/or with a mobile device. Therefore, such loudspeakers can achieve higher audio quality using immersive sound. Information related to the locations of the loudspeakers may be needed for immersive sound generation. Hence, auto-calibration may be needed before the loudspeakers can generate immersive sound.

SUMMARY

In at least one embodiment, an audio system is provided. The audio system includes a plurality of loudspeakers and a mobile device. The plurality of loudspeakers is capable of being positioned in a listening environment and being arranged to transmit an audio signal in the listening environment. Each loudspeaker is programmed to determine angle information of the audio signal as received at the loudspeaker relative to other loudspeakers of the plurality of loudspeakers and to transmit a first signal indicative of the angle information. The mobile device is programmed to receive the first signal from each of the loudspeakers and to determine a location for each loudspeaker in the listening environment based at least on the angle information.

In at least another embodiment, a method is provided. The method includes transmitting, via a plurality of loudspeakers capable of being positioned in a listening environment, an audio signal in the listening environment and determining, by each loudspeaker, angle information of the audio signal as received at each loudspeaker relative to other loudspeakers of the plurality of loudspeakers and transmitting a first signal indicative of the angle information. The method further includes receiving, at a mobile device, the first signal from each of the loudspeakers and to determine a location for each loudspeaker in the listening environment based at least on the angle information.

In at least another embodiment, an audio system including a plurality of loudspeakers and a primary loudspeaker. The plurality of loudspeakers is capable of being positioned in a listening environment and being arranged to transmit an audio signal in the listening environment. Each is loudspeaker programmed to determine angle information of the audio signal as received at the loudspeaker relative to other loudspeakers of the plurality of loudspeakers and to transmit a first signal indicative of the angle information. The primary loudspeaker is programmed to receive the first signal from each of the loudspeakers and to determine a location for each loudspeaker in the listening environment based at least on the angle information.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

FIGS. 8-9 depict an example of the microphone orientation and loudspeaker layout estimation operation of the method of FIG. 6 being performed on the configuration of FIG. 7 in accordance with one embodiment;

FIGS. 10-12 depict an example of the outlier detection operation of the method of FIG. 6 being performed on the configuration of FIG. 7 in accordance with one embodiment;

FIG. 17 depicts another example of the candidate coordinate estimation operation of the method of FIG. 6 being performed on the configuration of FIG. 7 in accordance with one embodiment;

FIG. 18 depicts another example of the candidate coordinate estimation operation of the method of FIG. 6 being performed on the configuration of FIG. 7 in accordance with one embodiment;

FIG. 20 depicts another example of the candidate coordinate estimation operation of the method of FIG. 6 being performed on the configuration of FIG. 7 in accordance with one embodiment;

FIG. 22 depicts another example of the best coordination selection operation of the method of FIG. 6 being performed on the configuration of FIG. 7 in accordance with one embodiment;

DETAILED DESCRIPTION

Figure 1:
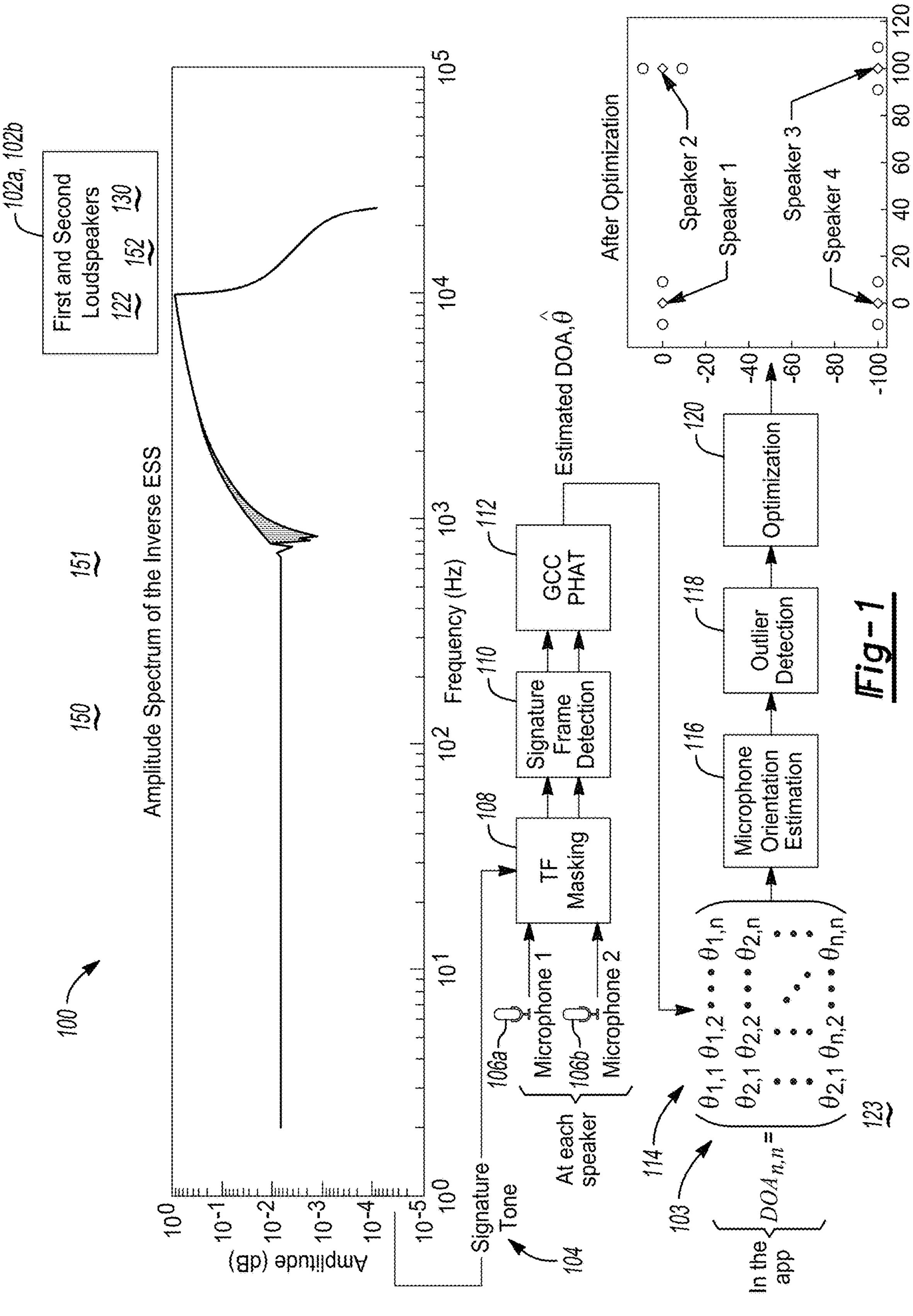
FIG. 1 generally depicts a system for performing noise-robust time-frequency masking-based direction and loudspeaker auto calibration and loudspeaker configuration layout estimation in accordance with one embodiment.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Noise Robust Time-Frequency Masking Based Direction of Arrival Estimation for Speaker Auto Calibration Loudspeakers are used to generate immersive sound effects. One aspect for immersive sound the need for auto-calibration to be performed to localize a position for the loudspeakers. One method for performing loudspeaker localization includes estimating an azimuth of the loudspeakers, which is also known as the direction of arrival estimation (DOA). The performance of DOA methods may be problematic for a low signal to noise ratio (SNR), i.e., below 0 dB, since noise is a dominating signal for low SNR conditions. Also, noise may not be avoided for auto-calibration stage in realistic scenarios. Therefore, the noise-robust DOA estimation method is needed for the auto-calibration stage. The disclosed system and/or method utilize time-frequency (TF) masking, which may be used for source separation, as a preprocessing step for the DOA estimation method to achieve high performance under low SNR. TF masking may extract a desired signal from a noisy signal that is captured by microphones. Aspects provided herein also provide a signature signal which maximizes performance under low SNR conditions. The embodiment disclosed herein provides a TF masking-based DOA estimation using at least two microphones and a signature signal design that may be played back by the loudspeaker.

As noted above, auto calibration is generally required for immersive sound generation for loudspeakers. A failure in the auto-calibration phase can cause negative feedback from listeners. Also, background noise is not avoidable as the environment cannot be controlled in the auto-calibration stage. Hence, noise-robust auto calibration is desirable for immersive sound generation using multiple loudspeakers. The disclosed embodiments provide noise-robust auto calibration to provide immersive sound generation. In addition, the disclosed system generally provides an accurate DOA estimation under low signal to noise ratio and reverberation for loudspeaker auto calibration. These aspects enable immersive sound generation and microphone array calibration. In addition, the disclosed system may accurately estimate the DOA for corner cases such as two loudspeakers are on, for example, a same line but not aiming at one another.

One manner in which auto-calibration of loudspeakers may involve estimating an angle of the loudspeakers, which is also known as the DOA. There are many techniques that estimate the DOA of talker/loudspeaker, such as time difference of arrival (TDOA), multiple signal classification (MUSIC), and steered response power (SRP). While the TDOA method has not provided satisfactory performance for low signal to noise ratio (SNR), MUSIC and SRP require a high number of microphones for high performance under low SNR. Even MUSIC and SRP methods perform below the requirement for low SNR conditions (i.e., −10 dB babble noise). The disclosed system provides a signature tone in the form of an inverse exponential sine sweep (ESS) signal which has been discovered to, among other things, provide an indication to a controller to in initiate loudspeaker autocalibration in noisy environments such as −10 dB. Other types of signature tones that do not utilize an ESS based signal, may not be perceivable to the controller in these types of noise environments.

FIG. 1 depicts a system 100 for performing noise-robust time-frequency masking-based direction and loudspeaker auto calibration and loudspeaker configuration layout estimation in accordance with one embodiment. The system 100 includes a loudspeaker 102 having a plurality of microphones 106*a*-106*b* (or "106"), a time frequency (TF) masking block 108, a signature frame detection block 110, a generalized cross-correlation (GCC) phase transform (PHAT) block 112, at least one controller 122 ("the controller 122"), and memory 130. The system 100 also includes a mobile device 150 having a matrix array 114, a microphone orientation estimation (MOE) block 116, an outlier detection block 118, an optimization block 120, and at least one controller 123 (hereafter "the controller 123"). It is recognized that the controller 123 may execute any instructions any of the functionality performed by the mobile device 150 as set forth herein. While FIG. 1 illustrates a single loudspeaker 102, it is recognized that the system 100 includes any number of loudspeakers 102 positioned therein.

At least one of the loudspeakers 102 transmits an audio signal including a signature tone 104 into a listening environment 151 to the other loudspeakers 102 in the system 100. It is recognized that the loudspeaker 102 generally includes at least two of the microphones 106*a*-106*b*. The loudspeaker 102 may transmit an audio signal including the signature tone 104 into the listening environment 151. The microphones 106*a*-106*b* positioned on a different loudspeaker 102 captures the audio signal including the signature tone 104. Each loudspeaker 102*a* and 102*b* includes memory 130. The memory 130 of the loudspeaker 102*b* stores the audio signal and the corresponding signature tone (or signature frame) 104 for processing.

As noted above, the TF masking block 108, the signature frame detection 110, the GCC PHAT block 112, and the controller 122 are implemented in all of the loudspeakers 102 that are present in the system 100. Assuming for example that the system 100 includes four loudspeakers 102, a first loudspeaker 102 receives the audio signal and corresponding signature tone 104 from the other loudspeakers 102. Thus, in the regard, each loudspeaker 102 estimates the direction of arrival (DOA) of the audio signals received from the three other loudspeakers 102. The mobile device 150 includes one or more transceivers 155 to wirelessly receive the DOA estimations from each of the loudspeakers 102 in the system 100. It is also recognized that each of the loudspeakers 102 in the system 100 may also include one or more transceivers 152 to wirelessly transmit the estimated DOA information to the mobile device 150.

In general, the TF masking block 108 in the loudspeaker 102 reduces a noise effect associated with the captured audio signal as received from the other loudspeakers 102 in the system 100. For example, the controller 122 applies the TF masking block 108 to each microphone input to reduce the noise effect. The signature frame detection block 110 estimates the signature tone 104 after the TF masking block 108 reduces the noise effect. In one example, the length of the signature tone 104 may be 200 msec. However, the loudspeaker 102 records the received audio, for example, for more than 200 msec since the loudspeaker 102 does not have knowledge of when the signature tone 104 is being played by the other loudspeaker 102. It may be assumed that the loudspeaker 102 may be in a recording mode while the other loudspeaker 102 transmits the signature tone 104. It is generally desirable to detect the signature tone 104 for a long enough duration to correctly estimate the DOA. Receipt of the signature tone 104 on the audio signal may be indicative to the receiving loudspeaker 102 that the system 100 may be in autocalibration mode. In the autocalibration mode, the loudspeakers 102 may transmit information corresponding to the location of these loudspeakers 102 relative to the mobile device 150 (or other audio source).

Figure 2:
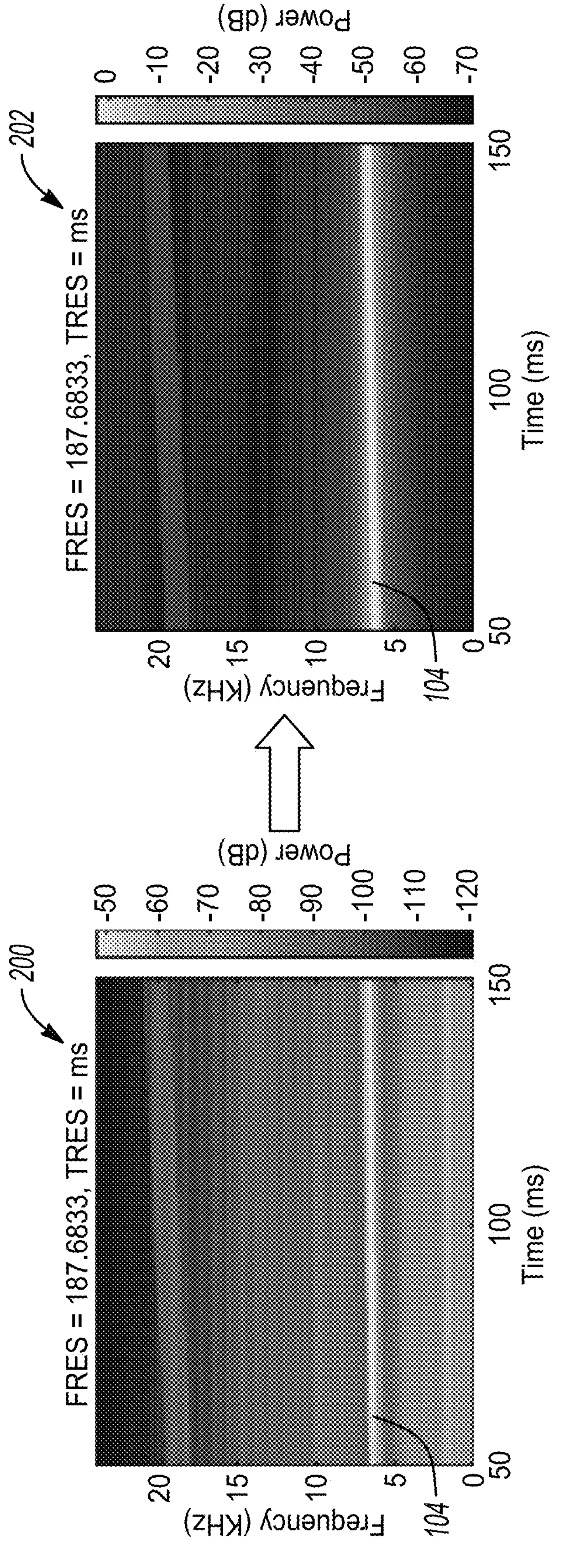
FIG. 2 depicts the manner in which time-frequency (TF) masking is applied remove noise in accordance with one embodiment.

The controller 122 applies cross-correlation between signature tone 104, which is played by the transmitting loudspeaker 102 and the acquired audio. The cross-correlation, performed by the GCC PHAT block 112 provides the location of the signature tone 104 in a long recording. In this regard, the controller 122 utilizes this location to extract the signature tone 104. At this point, the extracted signature tone 104 is provided to the GCC-PHAT block 112. The controller 122 may then utilize the estimated DOA to perform autocalibration of the loudspeaker 102*b*. These aspects will be discussed in more detail below. In reference back to the TF masking block 108, the controller 122 applies the TF masking operation as a pre-processing step for the DOA estimation. The TF masking block 108 may eliminate the most noise-dominated T-F bins in the audio signal to minimize the effects of noises and reverberations. A noisy input audio signal including the signature tone 104 is generally shown at 200 in connection with the FIG. 2. The noisy input audio signal including the signature tone 104 as shown in FIG. 2 includes a noise sweep sine of between 6-7 kHz. As shown generally at 202 in FIG. 2, in response to the TF masking block 108 performing the TF masking operation, the controller 122 extracts the signature tone 104 or signal from the noise mixture of the input audio signal.

Referring back to FIG. 1, the TF masking block 108 employs techniques for source separation and speech enhancement. The TF masking block 108 receives the signature tone 104 to generate an enhanced signal. The controller 122 utilizes the signature tone 104 via the enhanced signal to generate a sample delay $\hat{\eta}$. The controller 122 utilizes the sample delay $\hat{\eta}$ to determine the DOA of the received audio signal at the receiving loudspeaker 102. The TF masking-based techniques as noted above may include ideal binary mask (IBM), ideal ratio mask (IRM), a complex ideal ratio mask (cIRM), an optimal ratio mask (ORM), etc. In general, when employing a TF based DOA estimation, such a masking technique should not modify the phase information. Based on various requirements and testing, the disclosed system 100 may employ IRM which is defined by the following:

$$IRM(t, f) = \left(\frac{|S(t, f)|^2}{|S(t, f)|^2 + |N(t, f)|^2}\right)^{\beta} \tag{1}$$

Reference to equation 1 may be found, for example, in "The Optimal Ratio Time-Frequency Mask for Speech Separation in Terms of Signal-to-Noise Ratio", The Journal of the Acoustical Society of America 134, no. 5 (2013): EL452-EL458. While S(t, f) is the frequency response of the signature signal (or the signature tone 104), N(t, f) represents a noise spectrum and β is the smoothing factor. Since the overall knowledge of the signature tone 104, S(t, f) can be calculated. The denominator in equation (1) may be the captured signal at the microphones 106*a*-106*b*. After the controller 122 calculates the mask, the enhanced signal can be calculated using the multiplication of the captured signal with the mask as in equation (2).

$$E(t, f) = IRM(t, f) * Y(t, f) \tag{2}$$

E(t, f) represents the enhanced signal which is a two-channel signal given that the two microphones 106*a* and 106*b* of the receiving loudspeaker 102 each receive the incoming audio signal including the signature tone 104. Y(t, f) corresponds to the captured signal at the microphones 106*a*-106*b*. The enhanced signal may correspond to the signal as generally shown at 202 in FIG. 2 where the noise is removed from the captured audio signal.

Figure 3:
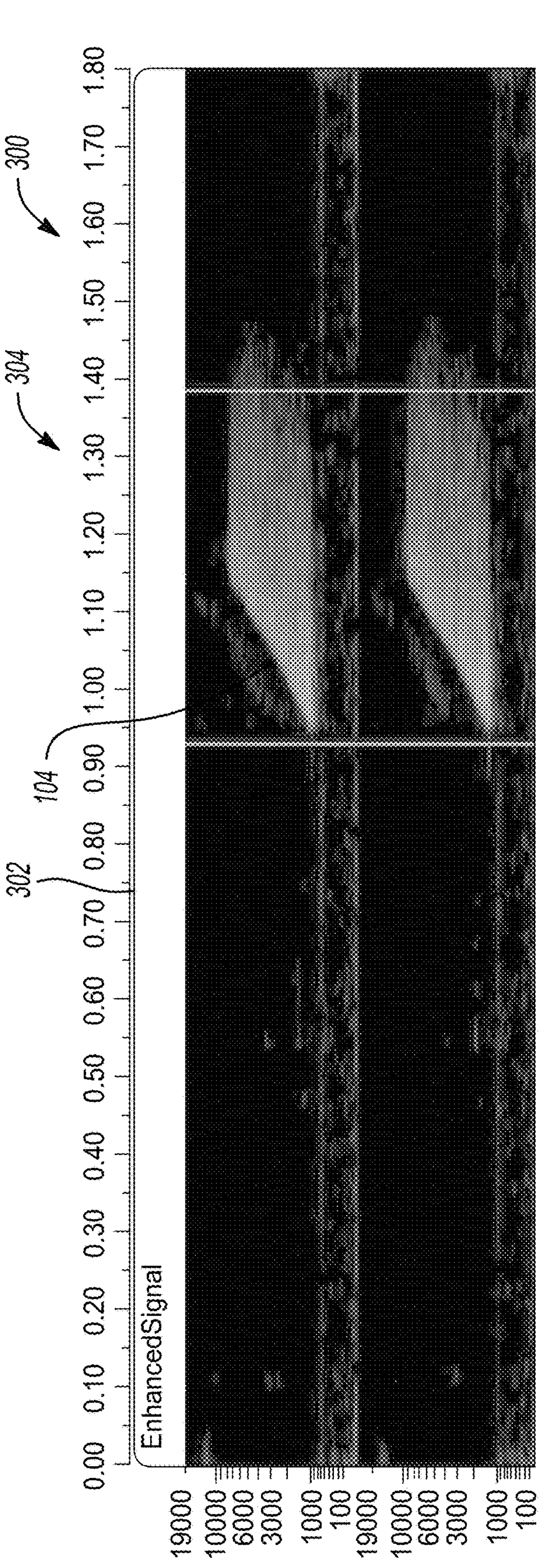
FIG. 3 depicts an output of a TF masking block in accordance with one embodiment.

FIG. 3 depicts an example of a recorded signal 300 provided by the TF masking block 108 of the loudspeaker 102 in accordance with one embodiment. For example, the recorded signal 300 corresponds to an output that is provided by the TF masking block 108 after the TF masking block 108 performs the masking operation. In general, the recorded signal 300 provided by the TF masking block 108 may comprise a long string of audio data 302 that includes silence/noise and the signature tone 104. The signature tone 104 is generally bounded by a frame 304. The two audio signals as shown in FIG. 3 correspond to one audio signal received at the microphone 106*a* and another audio signal received at the microphone 106*b* which are then processed by the TF masking block 108. The controller 122 utilizes cross-correlation between the audio data 302 and the signature tone 104 to detect the frame 304. In general, the controller 122 detects an enhanced version of the frame 304 (e.g., the signature tone 104 and acquired audio signal (e.g., which corresponds to the recorded signal 300, the audio data 302, and the frame 304)) to detect a start time of the frame 304. The GCC PHAT block 112 then receives as an input the frame 304.

Figure 4:
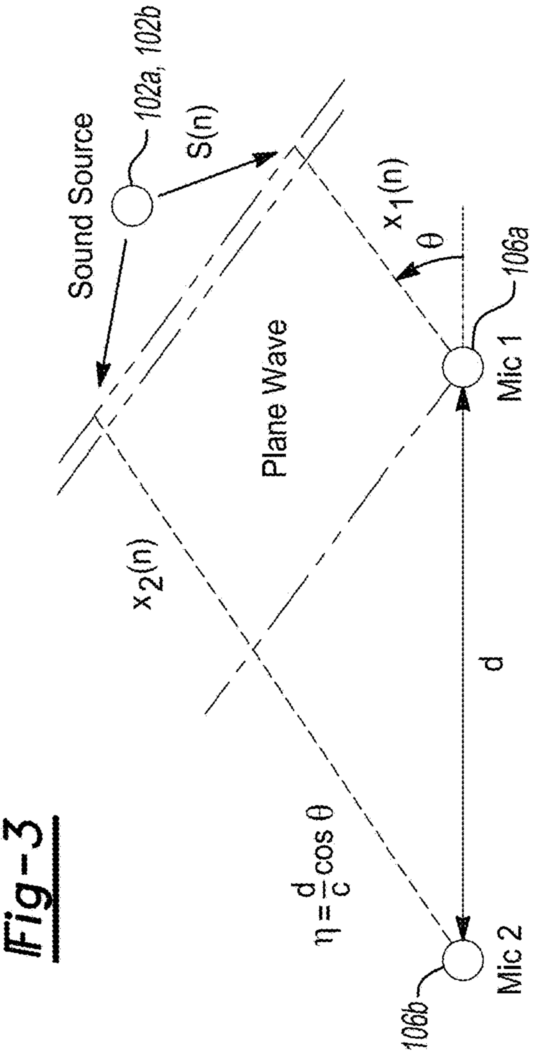
FIG. 4 depicts a two-microphone direction of arrival estimation using time difference of arrival.

Referring to FIGS. 1 and 4, the GCC PHAT block 112 processes the output of the signature frame detection block 110 to provide the estimated DOA for the captured audio signals transmitted by at least the loudspeaker 102. One example of the GCC PHAT operation is set forth in "The Generalized Correlation Method for Estimation of Time Delay", IEEE transactions on acoustics, speech, and signal processing 24, No. 4 (1976): 320-327 which is incorporated herein by reference in its entirety. As noted above, the loudspeakers 102 in the system 100 may provide (or wirelessly transmit) the estimated DOA reading to the mobile device 150 (see FIG. 1). The mobile device 150 may be a cell phone, laptop, desktop, etc. As also noted above, the loudspeaker 102 in the system 100 may include one or more transceivers 152 to wirelessly transmit and receive information (including estimate DOA readings) to one another and/or to the mobile device 150

The GCC PHAT block 112 may utilize a single-path wave propagation of sound waves from a single sound source signal s(n) that is provided by a sound source (or any one of the loudspeakers 102). The microphones 106*a* and 106*b* receive the signal s(n) as received signals $x_1(n)$ and $x_2(n)$ that are delayed and attenuated versions of the original sound signal s(n). In general, the controller 122 may determine a time delay between the received signals $x_1(n)$ and $x_2(n)$ by finding a max of cross correlation of $x_1(n)$ and $x_2(n)$ The controller 112 performs cross-correlation by executing the following equations:

$$r_{x_1 x_2} = x_1(m) * x_2(m) \tag{3}$$

$$R_{x_1 x_2}(\omega) = X_1(\omega) X_2^*(\omega) \tag{4}$$

$$\ddot{R}_{XY}(\omega) = \frac{X_1(\omega) X_2^*(\omega)}{|X_1(\omega) X_2^*(\omega)|} \tag{5}$$

$$\ddot{r}_{xy}(m) = \int \ddot{R}_{XY}(\omega) e^{j\omega m} d\omega \tag{6}$$

$$\hat{\eta} = \underset{m}{\operatorname{argmax}}\ \ddot{r}_{xy}(m) \tag{7}$$

The sample delay $\hat{\eta}$ is estimated using equation 3-7 in the GCC PHAT block 112. Equation 3 represents the cross-correlation between $x_1(n)$ and $x_2(n)$. Equation 4 is the cross-power density, which is obtained by taking the product of frequency response of $x_1(n)$ and $x_2(n)$. Equation 5 illustrates the PHAT processor (of the GCC PHAT block 112). The inverse Fourier transform is applied to obtain the cross-correlation between $x_1(n)$ and $x_2(n)$ as shown in equation 6. Finally, the sample delay $\hat{\eta}$ is calculated by finding a max of cross correlation of $x_1(n)$ and $x_2(n)$ in equation 7.

At that point, the controller 122 may determine the DOA of the received audio signal or the angle of the sound source 102*a* (or first loudspeaker 102*a*). For example, the controller 122 may determine the DOA (or angle information, "angle") for the audio signal as received as the receiving loudspeaker 102 by the following:

$$\hat{\theta} = \cos^{-1} \frac{\hat{\eta} c}{d} \tag{8}$$

where $\hat{\eta}$ is the estimate of the sample delay as noted above, c is a speed of sound, and d is a distance between the microphones 106*a* and 106*b* which is a known value. The GCC Phat block 112 estimates a phase difference between the audio captured between the microphones 106*a* and 106*b*. Thus, the phase difference generally corresponds to $\hat{\theta}$ (or angle information) as set forth in equation 8. The controller 122 utilizes, among other things, an inverse cosine to convert the phase difference to an enable as set forth in equation 8. The manner in which the controller 122 determines the sample delay $\hat{\eta}$ is shown in FIG. 4.

Figure 5:
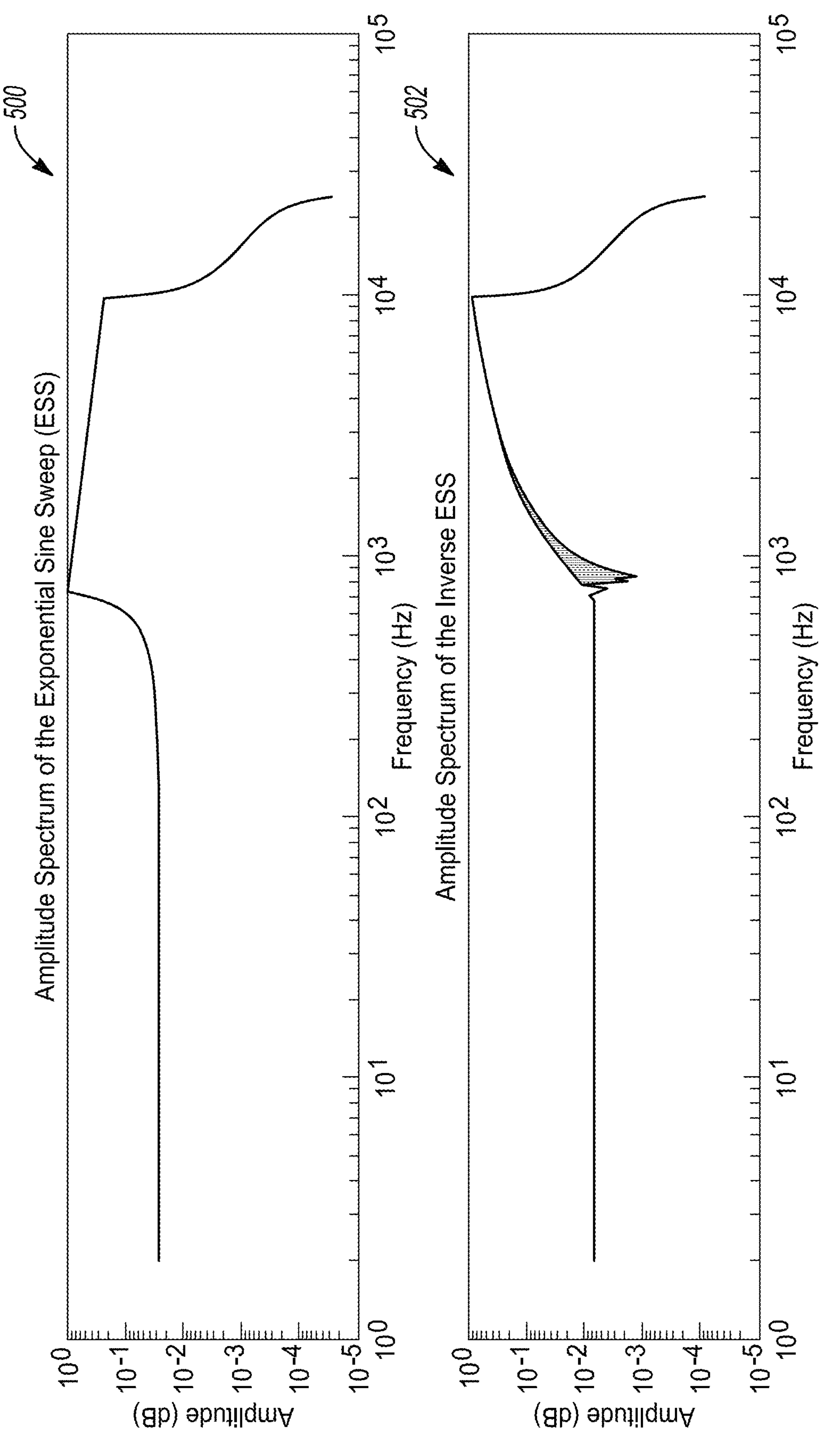
FIG. 5 depicts various signature tone signals in accordance with one embodiment.

FIG. 5 depicts various signature tone signals 500, 502 in accordance with one embodiment. In general, the signature tone 500 includes energy that sits under 4 kHz. The signature tone 500 may be generated based on an exponential sine sweep (ESS). In this case, it may be more desirable to provide a signature signal that includes more energy at high frequencies for higher noise-based environments to perform the estimated DOA. The signature tone signal 502 is generated based on an inverse ESS. FIG. 5 illustrates that both of the signature tone signals 500, 502 are in the frequency domain. The signature tone signal 502 has a higher amplitude after 1 kHz, which prevents the signature tone signal 502 from being distorted by background noise. In one example, the signature tone 104 as generated by the first or the second loudspeakers 102*a*, 102*b* may be based on the inverse ESS from a predetermined frequency range that may be 700 Hz to 10 kHz and having a predetermined length of, for example, 150 ms at a predetermined frequency of, for example, 48 kHz. The disclosed system 100 generally provides an accurate DOA estimation under low signal to noise ratio and reverberation for loudspeaker auto calibration. These aspects enable immersive sound generation and microphone array calibration. In addition, the disclosed system may accurately estimate the DOA for corner cases such as two loudspeakers are on, for example, a same line but not aiming at one another. It is recognized that the signature tone signal 500, 502 (e.g., the inverse EES signal) has been discovered withstand high noise environments of at least −10 dB level. For example, the inverse ESS signal has been found to be uninfluenced in high noise environments of at least −10 dB which serves to provide an adequate signal to trigger autocalibration and determination of the DOA for the various loudspeakers 102 in the system 100.

Optimization for Loudspeaker Auto Calibration and Loudspeaker Configuration Layout Estimation As noted above, the loudspeakers 102 in the system 100 are configured to communicate with one another. Each of the first and the second loudspeakers 102*a*, 102*b* may provide high audio quality while utilizing immersive sound. The immerse sound technology depends on the locations of the first and the second loudspeakers 102*a*, 102*b*. Thus, in this regard, the immersive sound technology requires an auto loudspeaker calibration process.

There are various ways to perform auto-calibration. One way to perform auto-calibration entails providing an estimate of an azimuth of the loudspeaker, also known as the DOAs. The DOA for an audio signal transmitted from each loudspeaker can be detected by playing the signature tone from one speaker at a time. The angles (or DOAs) from the different speakers are then used to create the speaker configuration in the room. In some cases, obtaining the estimate of the azimuth may be erroneous due to environmental conditions and locations of the loudspeakers. Such errors may occur primarily when the loudspeakers are not aimed at one another (e.g., due to loudspeaker directivity), and the background noise has more energy than the signature tone. Since these aspects may occur in real-world scenarios, auto-calibration technology implemented in the loudspeakers should address these scenarios. The system 100 as disclosed herein provides multiple DOA estimations for optimization loudspeaker location and estimating the loudspeaker layout configuration for two or more loudspeakers. The system 100 also provides an accurate representation of the loudspeaker configuration which is required for true immersive experience. The disclosed embodiments may increase robustness and overcome the above noted environmental conditions. In addition, the disclosed embodiments may provide (i) an accurate loudspeaker configuration estimation, (ii) loudspeaker orientation estimation, (iii) detection of DOA estimation outliers while taking into account background noise, reverberation, and obstruction, and (iv) optimizing the loudspeaker configuration estimation based on previous DOA estimations and outlier detection.

Referring back to FIG. 1, the system 100 further includes a matrix block 114, a microphone orientation estimation block 116, and outlier detection block 118, and an optimization block 120. The matrix block 114 stores DOA estimates for each of the first and the second loudspeakers 102*a*, 102*b*. As noted above, it is recognized that the system 100 may include any number of loudspeakers 102, preferably however, more than two loudspeakers 102 may be required. The microphone orientation estimation block 116 estimates an orientation for each of the microphones 106*a* and 106*b* as positioned on the loudspeakers 102. The outlier detection block 118 detects outliers that may be present in the matrix formed by the matrix block 114. These outliers or errors may be attributed to an erroneous DOA estimation or an obstruction between the first and the second loudspeakers 102*a*, 102*b*. The optimization block 120 performs reference microphone selection, an initial layout estimation, candidate coordinate estimations, and best coordinates selection. These aspects will be discussed in more detail below.

Figure 6:
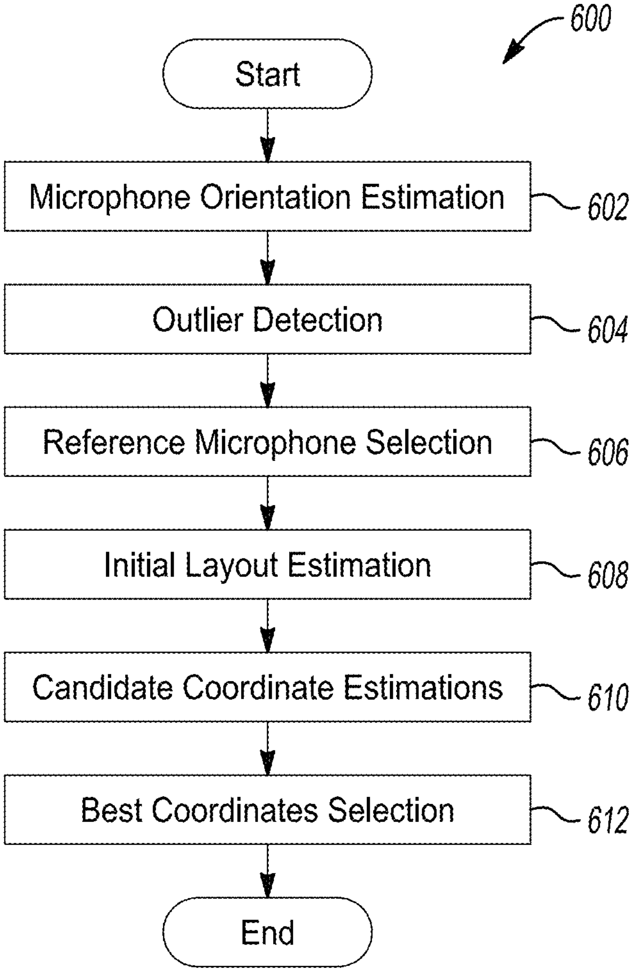
FIG. 6 depicts a method for performing an optimized loudspeaker auto calibration and a loudspeaker configuration estimation in accordance with one embodiment.

FIG. 6 depicts a method 600 for performing an optimized loudspeaker auto calibration and a loudspeaker configuration estimation in accordance with one embodiment.

In operation 602, the microphone orientation estimation block 116 estimates an orientation for the microphones 106*a* and 106*b*. This operation will be discussed in more detail in connection with FIGS. 8 and 9.

In operation 604, the outlier detection block 118 detects outliers that may be present in the matrix formed by the matrix block 114 with respect to the DOAs. This operation will be discussed in more detail in connection with FIGS. 10-11.

In operation 606, the optimization block 120 performs a reference microphone selection. This operation will be discussed in more detail in connection with FIG. 12.

In operation 608, the optimization block 120 performs an initial layout estimation using DOA estimations. This operation will be discussed in more detail in connection with FIG. 13.

In operation 610, the optimization block 120 calculates candidate coordinate estimations. This operation will be discussed in more detail in connection with FIGS. 14-16.

In operation 612, the optimization block 120 selects best coordinates. This operation This operation will be discussed in more detail connection with FIGS. 17-18.

Figure 7:
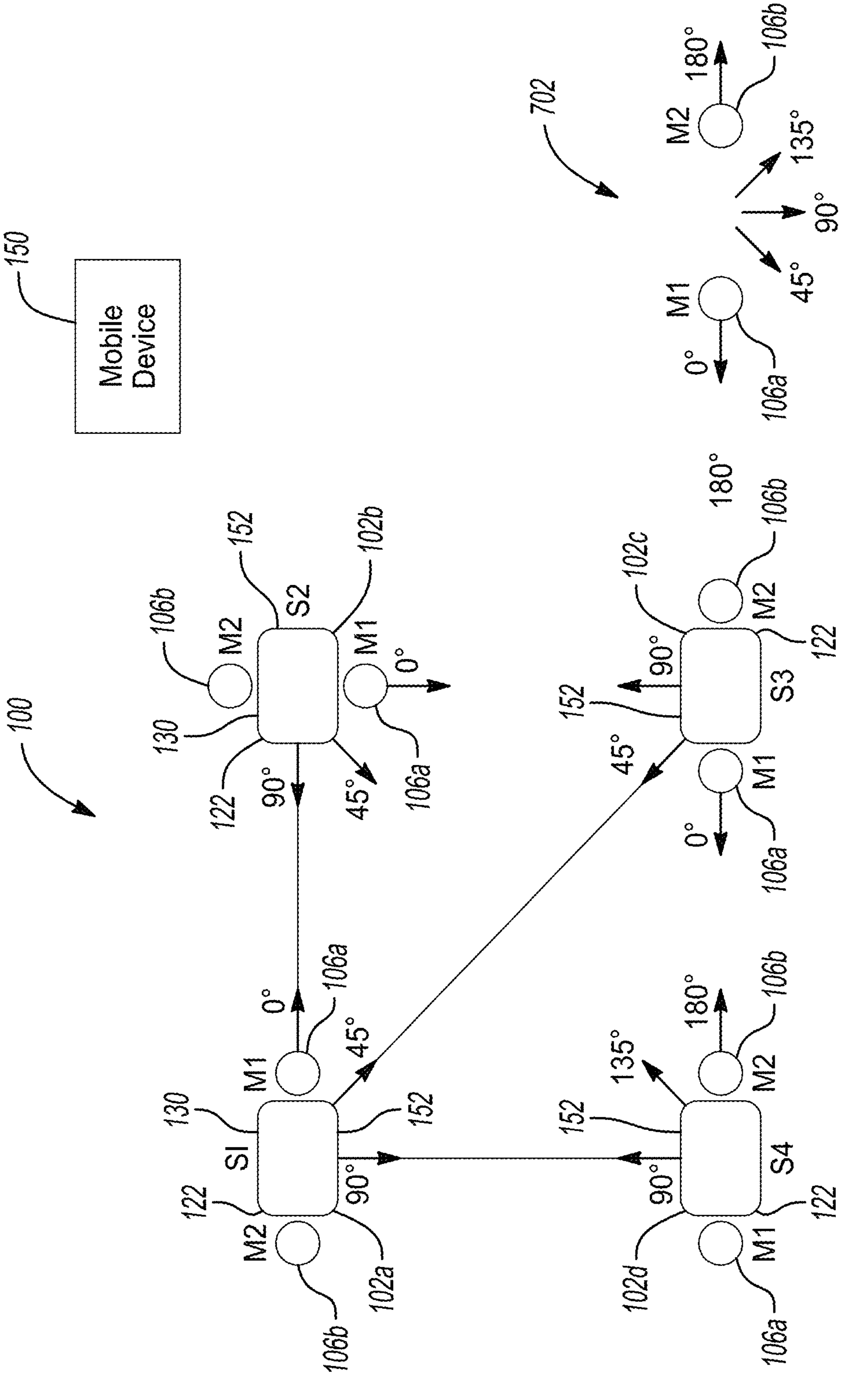
FIG. 7 depicts an example of the loudspeaker and microphone configuration in accordance with one embodiment.

FIG. 7 depicts an example of the loudspeaker and microphone configuration 700 in the system 100 in accordance with one embodiment. The configuration 700 includes the loudspeakers 102 of FIG. 1. The loudspeakers 102 of FIG. 1 are generally shown as a first loudspeaker 102*a*, a second loudspeaker 102*b*, a third loudspeaker 102*c*, and a fourth loudspeaker 102*d* with reference to FIG. 7 and hereafter. As noted in connection with FIG. 1, any number of loudspeakers may be provided. Each of the first, second, third, and fourth loudspeakers 102*a*, 102*b*, 102*c*, and 102*d* include the first and the second microphones 106*a* and 106*b*. Similarly, each of the first, second, third, and fourth loudspeakers 102*a*, 102*b*, 102*c*, and 102*d* include the controller 122, the memory 130, and the transceiver 152. Similarly, each of the first, second, third, and fourth loudspeakers 102*a*, 102*b*, 102*c*, and 120*d* include the TF masking block 108, the signature frame detection block 110, and the GCC PHAT block 112. As also noted above, the mobile device 150 includes the matrix block 114, the microphone orientation estimation block 116, the outlier detection block 118, and the optimization block 120. It is also recognized that in another embodiment, the system 100 may include a primary loudspeaker 103. The primary loudspeaker 103 may correspond any of the loudspeakers 102*a*-102*d* and may simply designated as the primary loudspeaker to perform similar task as the mobile device 150. For example, the primary loudspeaker 103 may be arranged to provide the layout of the loudspeakers 102 including the layout for the primary loudspeaker 103 based on the principles disclosed herein. In this sense, the primary loudspeaker 103 provides a similar level of functionality as that as provided in connection with the mobile device 150 in the event it may be preferred for the primary loudspeaker 103 to provide the location of the various loudspeakers 102 and 103 within the listening environment 151 for the purpose of establishing channel assignment for the loudspeakers 102 and 103. Thus, in this regard, the primary loudspeaker 103 may include the matrix block 114, the microphone orientation estimation block 116, the outlier detection block 118, and the optimization block 120. While the primary loudspeaker 103 may provide the location of the loudspeakers 102, 103 in the listening environment 151 in a similar manner to that explained with the mobile device 150, the primary loudspeaker 103 may not provide any visual indicators or prompts to the user with respect to the location of the loudspeaker 102, 103.

The first, second, third, and fourth loudspeakers 102*a*, 102*b*, 102*c*, and 102*d* wirelessly communicate with one another via the transceivers 152 and/or with the mobile device 150 to provide the loudspeaker layout in a listening environment 151. In particular, the mobile device 150 may provide a layout of the various loudspeakers 102*a*, 102*b*, 102*c*, and 102*d* as arranged in the listening environment 151. Generally, the particular layout of the loudspeaker 102*a*-102*d* may not be known relative to one another and aspects set forth herein may determine the particular layout of the loudspeakers 102*a*-102*d* in the listening environment 151. Once the layout of the loudspeakers 102*a*-102*d* is known, the mobile device 150 may assign channels to the loudspeakers 102*a*-102*d* in a deterministic way based on the prestored or predetermined system configurations.

The mobile device 150 may display the layout of the first, second, third, and fourth loudspeakers 102*a*, 102*b*, 102*c*, and 102*d* based on information received from such devices. In one example, the first, second, third, and fourth loudspeakers 102*a*, 102*b*, 102*c*, and 102*d* may wirelessly transmit DOA estimations, microphone orientation estimation information, outlier information, reference loudspeaker selection information, initial loudspeaker layout estimation, candidate coordinate estimation information, and best coordinate selection information as set forth in the method 600 to one another via the transceivers 152 and/or with the mobile device 150.

A legend 702 is provided that illustrates various angles of positions of the microphones 106*a*-106*b* on one loudspeaker 102 relative to microphones 106*a*-106*b* on other the loudspeakers 102*a*, 102*b*, 102*c*, and 102*d*. Reference will be made to the legend 702 in describing the various operations of the method 600 below. The first, third, and fourth loudspeakers 102*a*, 102*c*, and 102*d* illustrate that their respective microphones 106*a*-106*b* are arranged horizontally on such loudspeakers 102*a*, 102*c*, and 102*d*. The second loudspeaker 102*b* illustrates that the microphones 106*a*-106*b* are arranged vertically on the second loudspeaker 102*b*. It is recognized that prior to the loudspeaker layout being determined, the arrangement of the microphones 106*a*-106*b* is not known and that the arrangement of the microphones 106*a*-106*b* may be arranged in any number of configurations on the loudspeakers 102*a*-102*d* in the listening environment 151. The disclosed system 100 and method 600 are configured to determine the loudspeaker configuration layout while taking into account the different configurations of microphones 106*a*-106*b*.

Referring to the first loudspeaker 102*a* and further in reference to the legend 702, the first loudspeaker 102*a* is capturing audio (or detecting audio) from the second loudspeaker 102*b* at 0 degrees. The first loudspeaker 102*a* is capturing audio (or detecting audio) from the third loudspeaker 102*c* at 45 degrees. The first loudspeaker 102*a* is capturing audio from the fourth loudspeaker 102*d* at an angle 90 degrees. The angle (or angle information) at which the remaining loudspeakers 102*b*-102*d* are receiving audio relative to the other loudspeakers 102*a*-102*d* are illustrated in FIG. 7. Any reference to the term "angle" may also correspond to "angle information" or vice versa. The relevance of the angles (or angle information) will be discussed in more detail below. It is recognized that each of the loudspeakers 102*a*-102*d* transmit information related to the angle information at which they receive the audio from one another to the mobile device 150 or other suitable computing device. The mobile device 150 stores the angles in memory thereof. The DOA information as reported out by the loudspeakers 102*a*-102*d* are reported out as the angles as referenced above.

Figure 9:
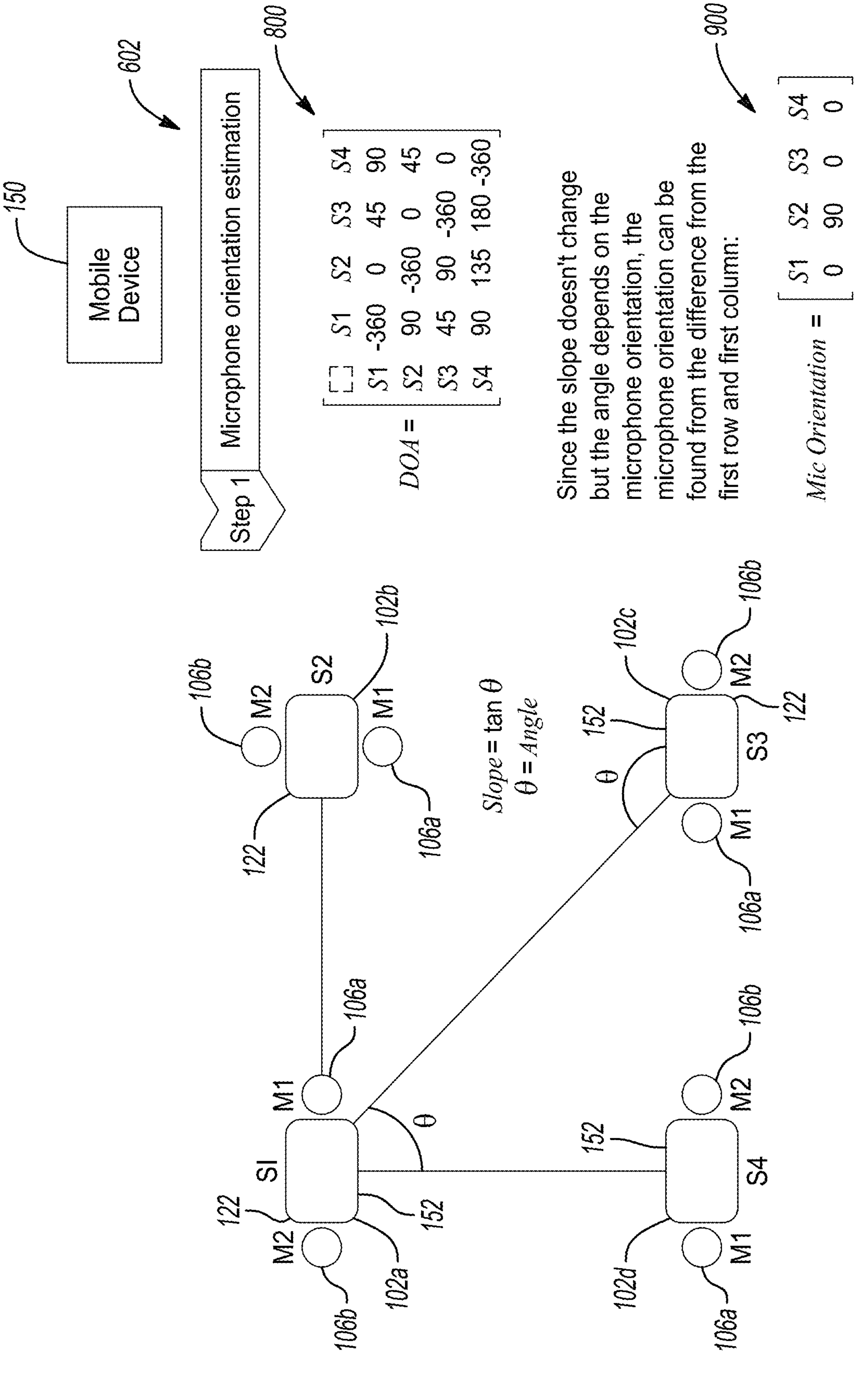

FIGS. 8-9 depict an example of the microphone orientation and operation 604 of the method 600 of FIG. 6 being performed on the configuration of FIG. 7 in accordance with one embodiment. At least one embodiment provides a two-speaker location in space that establishes a line and the slope of the line doesn't change when viewed from one loudspeaker or another loudspeaker. In general, the system 100 and/or method 600 recognizes that a two-loudspeaker location in space establishes a line and a slope of the line doesn't change from one loudspeaker to another loudspeaker. First matrix 800 is illustrated that depicts the relative angles of audio that is received relative to the various loudspeaker 102*a*-102*d* (or S1-S4, respectively). Any angle reading of −360 represents a null value. For example, the first matrix 800 illustrates that S1 in both the column and row of the matrix is −360 since the first loudspeaker 102*a* (or S1) cannot receive audio from itself). This is further illustrated for any values that illustrate an angle of 360 for the second loudspeaker 102*b* (or S2), the third loudspeaker 102*c* (or S3), and the fourth loudspeaker 102*d* (or S4).

The mobile device 150 generally stores information corresponding to the angle information depicted in the first matrix 800. The first column as shown by the dashed box as illustrated in the first matrix 800 corresponds to the particular loudspeaker that is receiving audio from the loudspeakers S1-S4 as illustrated in columns 2-5, respectively. For example, in reference to the first column and second row, the second loudspeaker (e.g., or S2) 102*b* receives audio from the first loudspeaker (e.g., or S1) 102*a* (as shown in the second column) at an angle of 90 degrees, the second loudspeaker 102*b* receives audio from the third loudspeaker 102*c* at an angle of 0 degrees, the second loudspeaker 102*b* receives audio from the fourth loudspeaker 102*d* (or S4) at an angle of 45 degrees. In reference to the first column and the third row, the third loudspeaker 102*c* (e.g., or S3) receives audio from the first loudspeaker 102*a* (e.g., or S1) at an angle of 45 degrees, and the third loudspeaker 102*c* (e.g., or S3) receives audio from the fourth loudspeaker 102*d* (e.g., or S4) at an angle of 0 degrees. In reference to the first column and the fourth row, the fourth loudspeaker 102*d* receives audio from the first loudspeaker 102*a* (or S1) at an angle of 90 degrees, the fourth loudspeaker 102*d* receives audio from the second loudspeaker 102*b* (or S2) at an angle of 135 degrees, and the fourth loudspeaker 102*d* receives audio from the third loudspeaker 102*c* (or S3) at an angle of 180 degrees.

Referring to FIG. 9, the mobile device 150 receives the information corresponding to the various angles from the transceivers 152 of the first, second, third, and fourth loudspeakers 102*a*, 102*b*, 102*c*, and 102*d*, respectively. As noted above, the mobile device 150 assembles the first matrix 800 based on the information received from the first, second, third, and fourth loudspeakers 102*a*, 102*b*, 102*c*, and 102*d*, respectively. The mobile device 150 may determine the orientation of the microphones 106*a*-106*b* for the first, second, third, and fourth loudspeakers 102*a*, 102*b*, 102*c*, and 102*d* relative to one another. In particular, the mobile device 150 may determine whether the orientation of the microphones 106*a*-106*b* for the various first, second, third, and fourth loudspeakers 102*a*, 102*b*, 102*c*, and 102*d* are different from one another based on the angles that are stored in the first matrix 800. The embodiments disclosed herein generally illustrate that the slope may not change but the angle depends on the orientation of the microphones 106*a*-106*b* which can be from the first for and the first column as shown generally shown at 900.

For example, the mobile device 150 may determine whether the difference in angles between the first, second, third, and fourth loudspeaker 102*a*, 102*b*, 102*c*, and 102*d* as illustrated in the first matrix 800 correspond to one or more predetermined values (e.g., 0 or 180). In the event the difference between the angles for the first, second, third, and fourth loudspeakers 102*a*, 102*b*, 102*c*, and 102*d* correspond to the one or more predetermined values, then the mobile device 150 may determine that the microphones 106*a*-106*b* for the two or more loudspeakers 102*a*, 102*b*, 102*c*, 102*d* are in the same orientation. In the event the difference between the angles for the first, second, third, and fourth loudspeakers 102*a*, 102*b*, 102*c*, and 102*d* does not correspond to the one or more predetermined values, then the mobile device 150 may determine that the microphones 106*a*-106*b* are not in the same orientation for the two or more loudspeakers 102*a*, 102*b*, 102*c*, 102*d*.

In reference to the first matrix 800 as illustrated in FIG. 9, the mobile device 150 determines that the second loudspeaker 102*b* has a difference of 90 degrees with respect to the first, third, and fourth loudspeakers 102*a*, 102*c*, and 102*d*. Thus, in this regard, the mobile device 150 determines that the orientation of the microphones 106*a*-106*b* for the second loudspeaker 102*b* is different than that of the orientation of the microphones 106*a*-106*b* for the first, third, and fourth loudspeakers 102*a*, 102*c*, and 102*d*. This is shown in FIG. 9.

In general, the mobile device 150 subtracts the angle from the first column from the first row to perform the microphone orientation estimation. Then the subtraction operation is performed, the result is [0, 90, 0, 0] for the first loudspeaker 102*a* (or S1), the second loudspeaker 102*b* (or S2), the third loudspeaker 102*c* (or S3), and the fourth loudspeaker 102*d* (or S4). Therefore, the microphone estimation for the third loudspeaker 102*c* (S3) and the fourth loudspeaker 102*d* (S4) is 0, which is the same orientation as the first loudspeaker 102. The mobile device 150 may also perform the microphone orientation with a modulo operation after the subtraction operation is performed since the angle range should be [0, 180] as identified in the legend 702 of FIG. 7. In general, the slope between the loudspeakers 102*a*-102*d* may not change, however the angle may depend on the orientation of the microphones 106*a*-106*b*. The mobile device 150 generates a microphone orientation array 900 that includes the difference in angle that does not correspond to 0 or 180 degrees (or the predetermined values). The embodiments disclosed herein generally illustrate that the slope may not change but the angle depends on the orientation of the microphones 106*a*-106*b* which may be found from the first row and the first column of the microphone orientation array.

Figure 10:
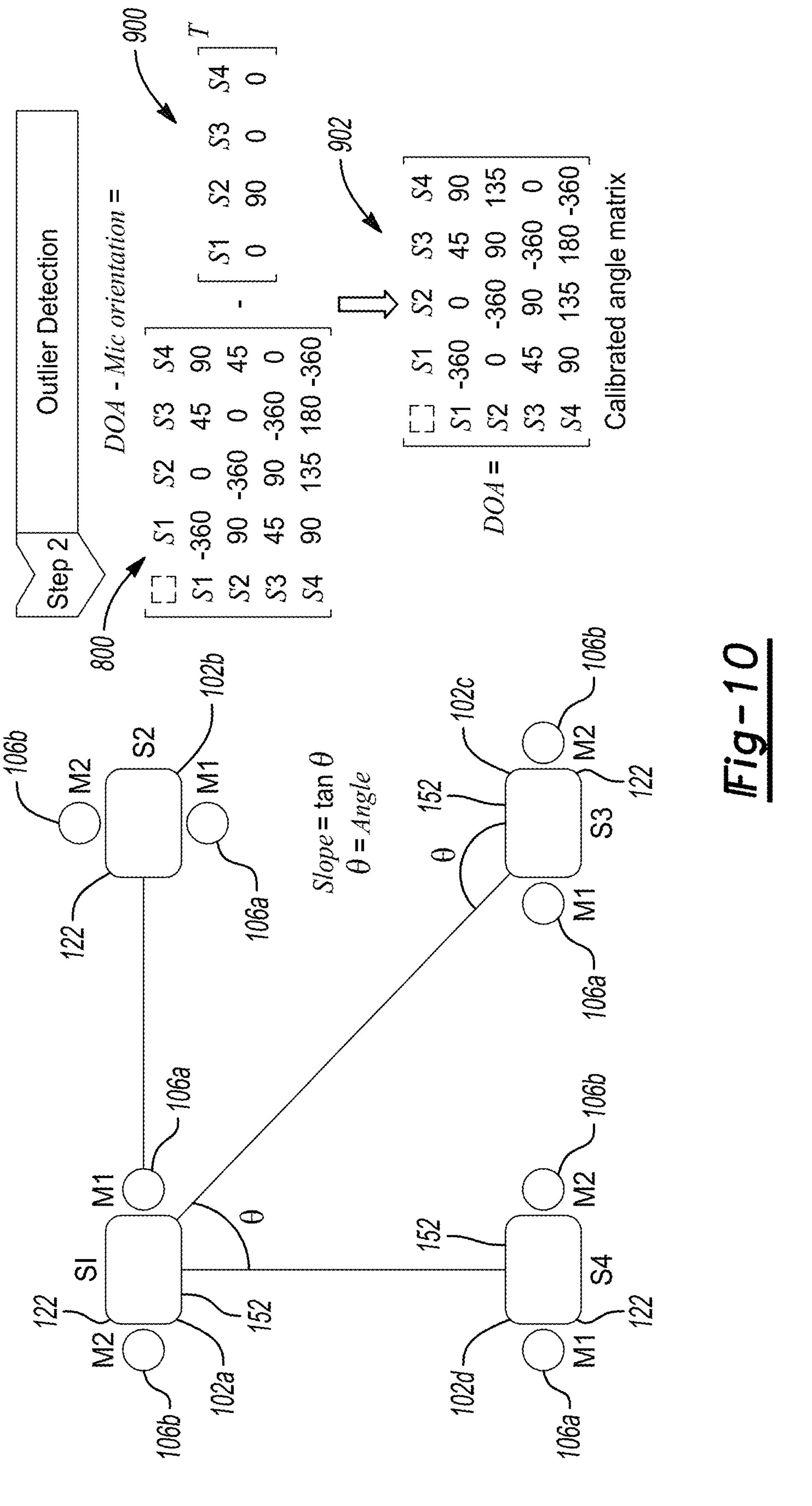
Figure 11:
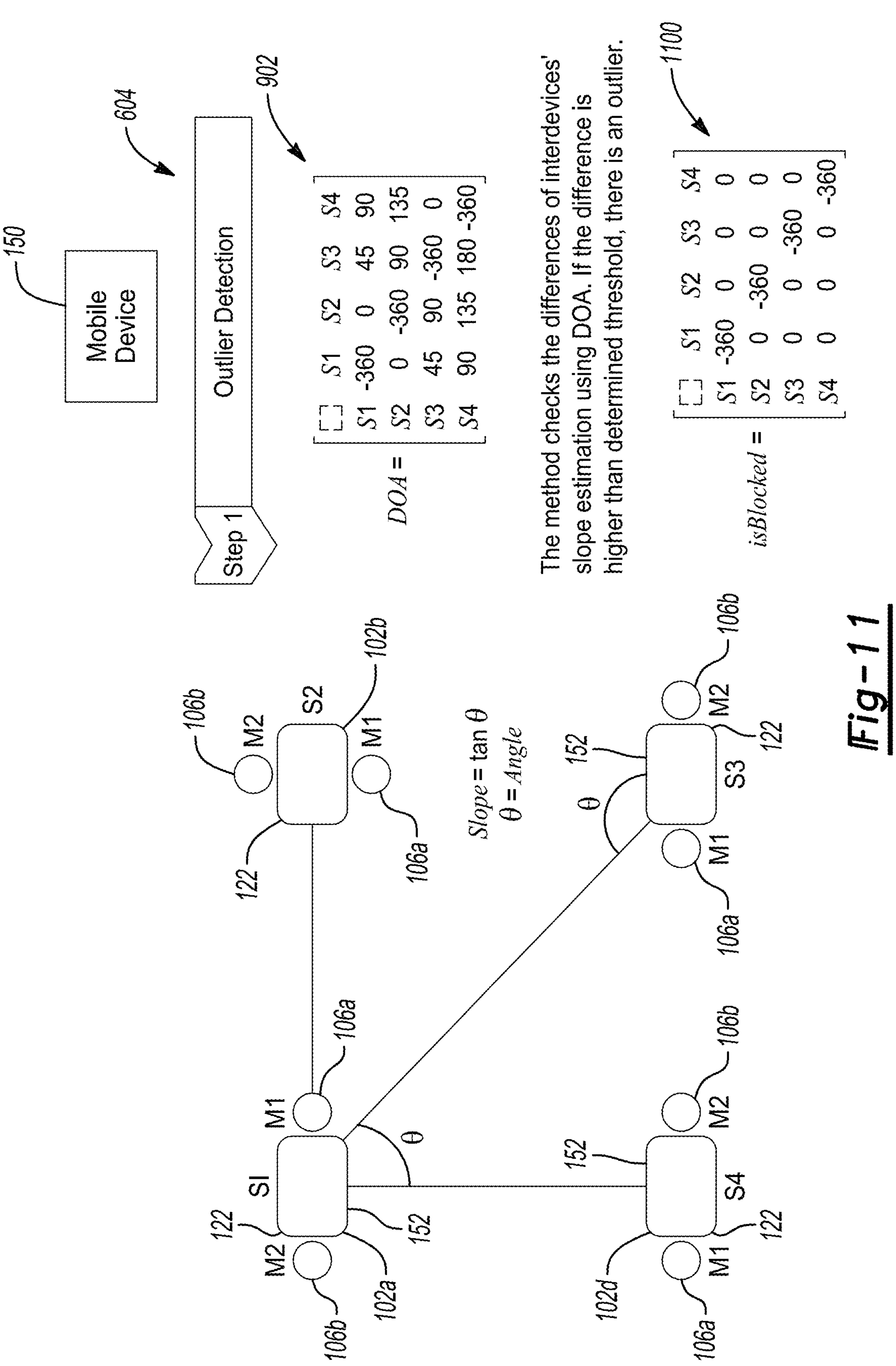

FIGS. 10-12 depict an example of the outlier detection operation 604 of the method 600 of FIG. 6 being performed on the configuration of FIG. 7 in accordance with one embodiment. After performing the microphone orientation estimation of operation 602, the mobile device 150 performs the outlier detection operation 604 to determine whether any of the loudspeakers 102*a*-102*d* are an outlier with respect to the layout. If any of the loudspeakers 102*a*-102*d* are determined to be an outlier, the mobile device 150 determines that the location of the loudspeaker 102 is incorrect or cannot be ascertained relative to the locations of the other loudspeakers 102*a*-102*d*.

Referring to FIG. 10, the mobile device 150 subtracts the microphone orientation array 900 from the first matrix 800 to provide a calibrated angle matrix 902 as part of operation 604. The mobile device 150 takes into account the loudspeaker(s) that have a microphone orientation that is not aligned with the remaining microphones of the loudspeakers. For the calibrated angle matrix 902 as shown in FIG. 10, it is shown that the angle of 90 degrees from the microphone orientation array 900 is subtracted from the angles (except for −360 since this is a null value) in the second row (S2) to provide the following in the calibrated angle matrix 902 [0, −360, 90, 135].

Referring to FIG. 11, the mobile device 150 may compare the angles as shown in row 2 of the calibrated angle matrix 902 to predetermined threshold values as part of operation 604 in accordance with one example. If the any one or more of the angles in row 2 of the calibrated angle matrix 902 is higher than the predetermined threshold values, then the mobile device 150 detects an outlier for the one or more loudspeakers 102*a*-102*d* that have a higher angle than that of the predetermined threshold values. The mobile device 150 generates a blocked matrix 1100 as generally shown in FIG. 11. For example, the mobile device 150 checks the difference between each pair of estimations (e.g., the angle estimation of the second loudspeaker 102*b* at the first loudspeaker 102*a* and the angle estimation of the first loudspeaker 102*a* at the second loudspeaker 102*b*). The mobile device 150 may apply, for example, a modulo 180 to ensure that the difference is in the range of [0, 180] degrees. If the difference is higher than the predetermined threshold value, the mobile device 150 may determine that an outlier exists for the pair of loudspeakers. In this example, the blocked matrix 1100 does not indicate an error for any of the loudspeakers 102*a*-102*d*. Thus, in this regard, the angles in row 2 of the calibrated angle matrix 902 is less than the predetermined threshold values. The outlier generally represents various erroneous estimations in DOA matrix. The detected outliers may not be used in optimization (e.g., operations 606, 608, and 610).

Referring to FIG. 12 and similar to that example noted in connection with FIG. 11, the mobile device 150 may compare the angles as shown in row 2 of the calibrated angle matrix 902 to predetermined threshold values as part of operation 604 in accordance with another example. However, with the example illustrated in connection with FIG. 12, row 2 of the calibrated angle matrix 902 differs from the matrix 902 as illustrated in FIG. 11 and corresponds to [0, −360, 25, 135]. In this regard, when the mobile device 150 compares the angles as shown in row 2 of the calibrated angle matrix 902 to the predetermined threshold values, the mobile devices 150 generates a value “1” as shown in row 3, col. 2 and in row 2, col. 3 in the blocked matrix 1100. In reference to the blocked matrix 1100, all values of 0 are not indicative of an outlier and as noted above, the angles of −360 merely correspond to null values and may be ignored. In this case of the blocked matrix 1100, the third loudspeaker 102*c* is determined to be an outlier relative to the second loudspeaker 102*b*. The estimations in row 2, col. 3 and row 3, col. 2 will not be used for operations 606, 608, 610.

Figure 13:
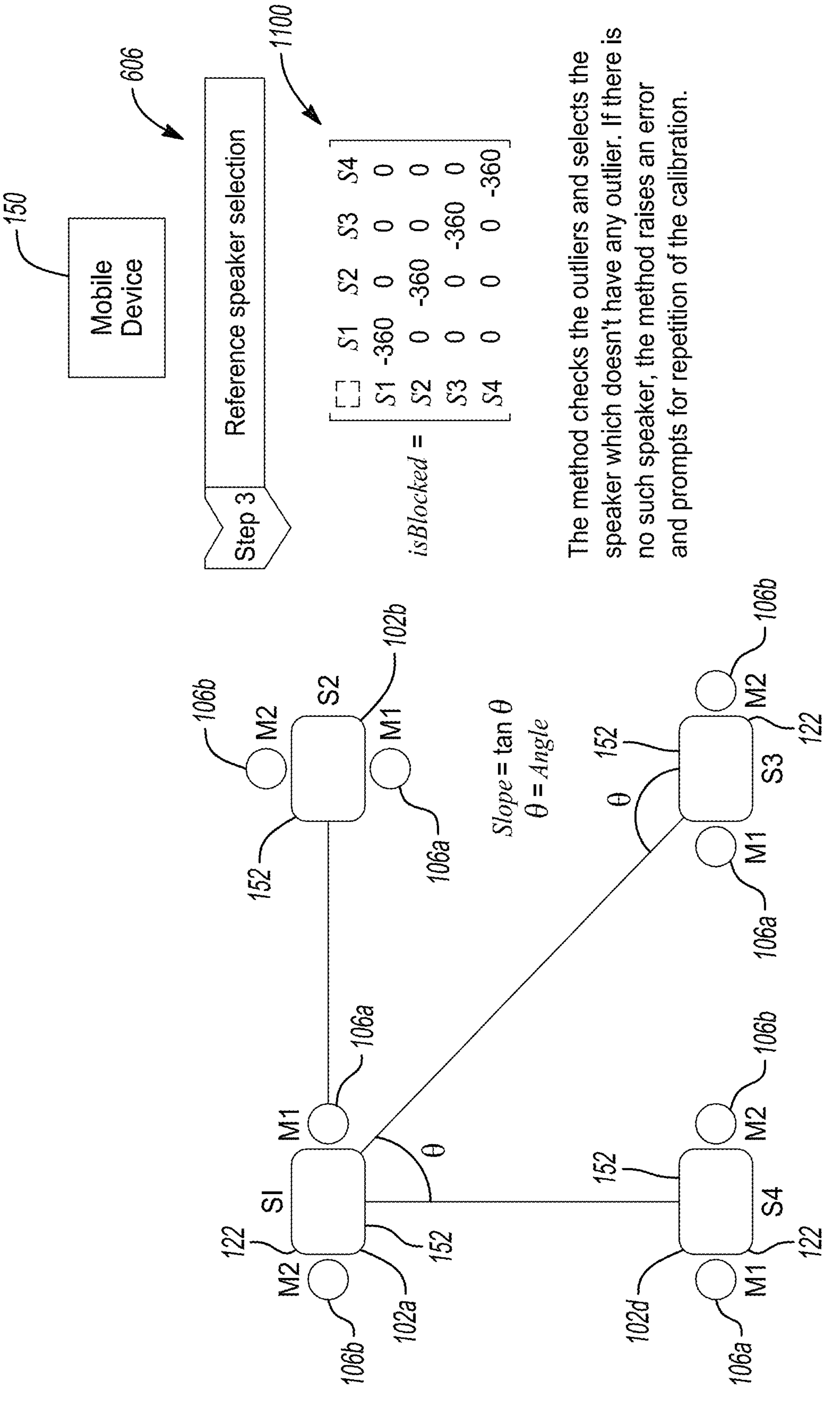
FIG. 13 depicts an example of the reference speaker selection operation of the method of FIG. 6 being performed on the configuration of FIG. 7 in accordance with one embodiment.

FIG. 13 depicts an example of the reference speaker selection operation 606 of the method 600 of FIG. 6 being performed on the configuration of FIG. 7 in accordance with one embodiment. The mobile device 150 may then check the blocked matrix 1100 for any rows/columns that are populated with “1”. As noted above, these values are generally indicative of the loudspeaker being an outlier. The blocked matrix 1100 as illustrated in connection with FIG. 13 is similar to the blocked matrix 1100 as illustrated in connection with FIG. 11 and does not indicate the presence of any outliers. In the event the mobile device 150 does not detect an outlier in the blocked matrix 1100, the mobile device 150 generates an error and repeats the method 600 again.

Figure 14:
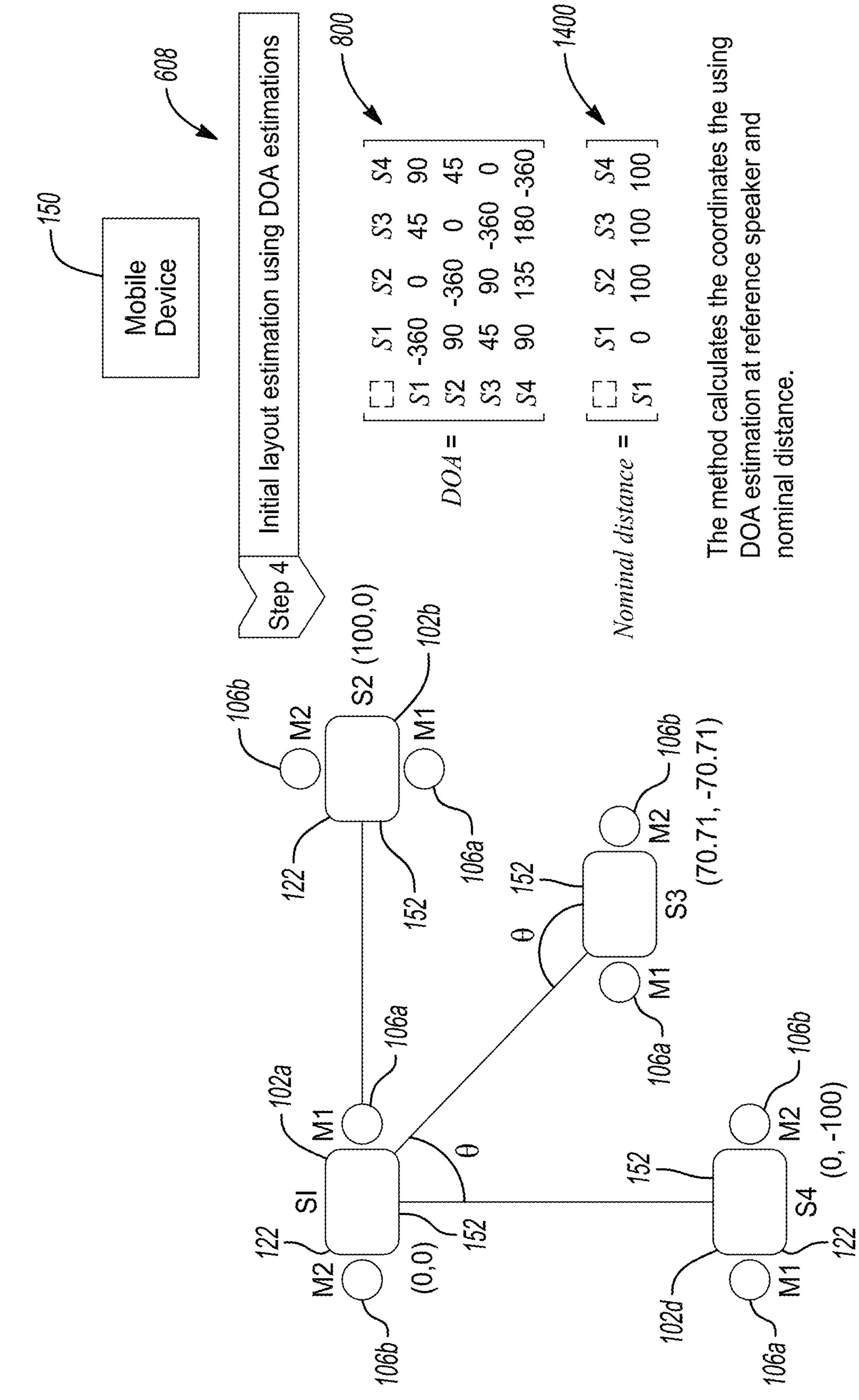
FIG. 14 depicts an example of the microphone orientation and loudspeaker layout estimation operation of the method of FIG. 6 being performed on the configuration of FIG. 7 in accordance with one embodiment.
Figure 15:
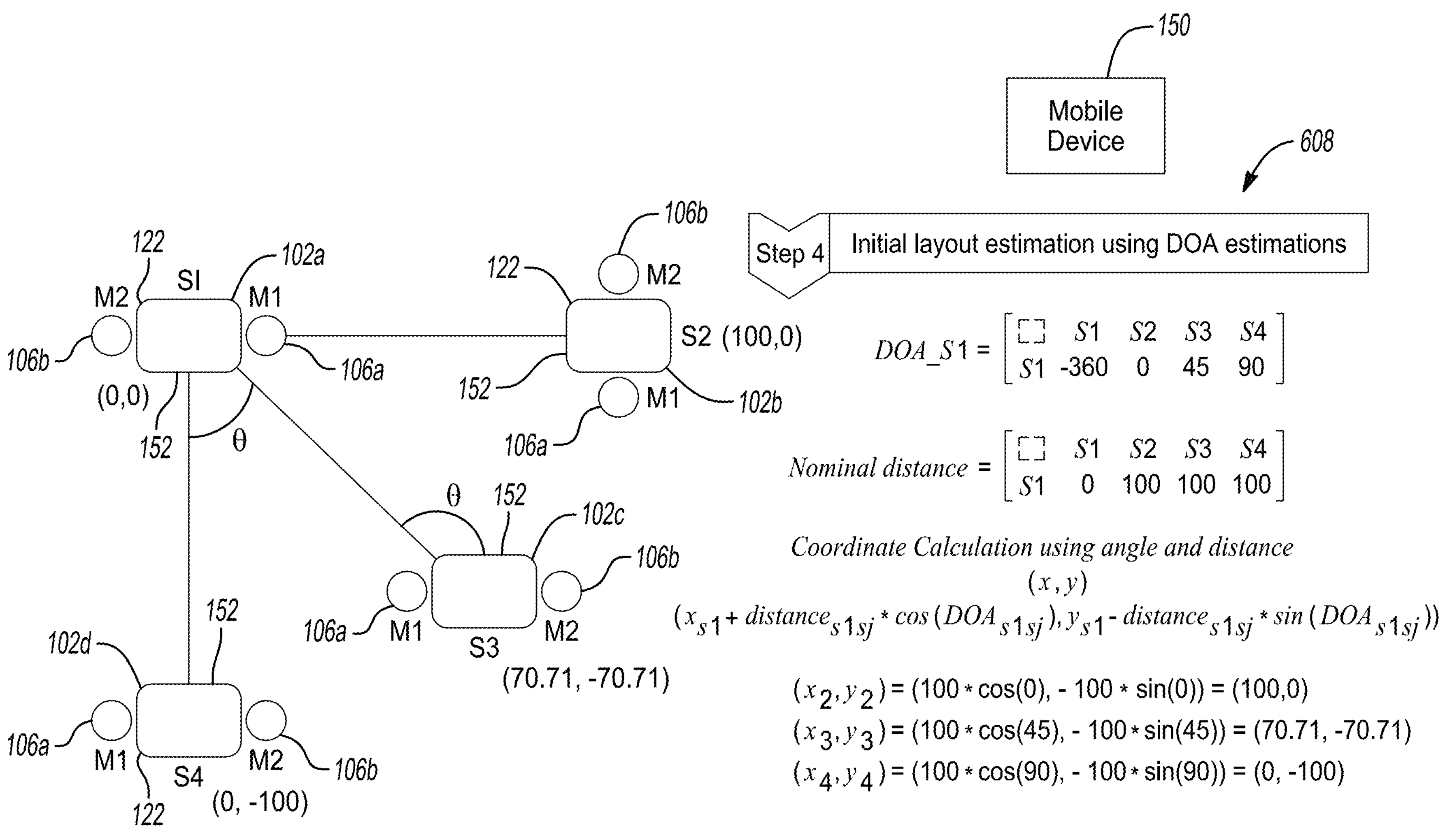
FIG. 15 depicts an example of the microphone orientation and loudspeaker layout estimation operation of the method of FIG. 6 being performed on the configuration of FIG. 7 in accordance with one embodiment.

FIGS. 14 and 15 depict an example of the microphone orientation and loudspeaker layout estimation operation 608 of the method 600 of FIG. 6 being performed on the configuration of FIG. 7 in accordance with one embodiment. With reference to FIG. 14, the configuration of the first, second, third, and fourth loudspeakers 102*a*-102*d* as illustrated is now reflected to include distance coordinates in the x & y axis. As shown, the first loudspeaker 102*a* is selected as a reference loudspeaker. The second loudspeaker 102*b* has coordinates (100, 0) relative to the first loudspeaker 102*a*, the third loudspeaker 102*c* has coordinates (70.71, −70.71) relative to the first loudspeaker 102*a*, and the fourth loudspeaker 102*d* has coordinates (0, −100) relative to the first loudspeaker 102*a*. As noted above, the mobile device 150 does not have knowledge of the exact layout of the loudspeakers 102*a*-102*d* in the listening environment 151. As such, the mobile device 150 establishes a reference matrix 1400 that has reference coordinates (or distances or values): 0, 100, 100, 100 for the first, second, third, and fourth loudspeakers 102*a*, 102*b*, 102*c*, and 102*d*, respectively. The mobile device 150 selects the coordinates (e.g., 0, 100, 100, 100) randomly. In this case, the mobile device 150 assumes that the second loudspeaker 102*b*, the third loudspeaker 102*c*, and the fourth loudspeaker 102*d* are equally positioned away from the first loudspeaker 102*a*. As exhibited by the first matrix 800, the mobile device 150 has information corresponding to angles with respect to the audio that is received by the first, second, third, and fourth loudspeaker 102*a*, 102*b*, 102*c*, and 102*d*. However, the actual distance of such loudspeakers 102*a*-102*d* are not known.

Referring now to FIG. 15, the mobile device 150 calculates the distance (or x, y coordinates) for the second loudspeaker 102*b*, the third loudspeaker 102*c*, and the fourth loudspeaker 102*d* relative to the first loudspeaker 102*a* may be determined based on equation 9 below:

$$(x, y)(x_{s1}+\text{distance}_{s1sj}*\cos(DOA_{s1sj}),\ y_{s1}-\text{distance}_{s1sj}*\sin(DOA_{s1sj}))$$

For example, the mobile device 150 may calculate the distance coordinates for the second loudspeaker 102*b*, the third loudspeaker 102*c*, and the fourth loudspeaker 102*d* relative to the first loudspeaker 102*a* based on equations 10, 11, and 12, respectively:

$$(x_2, y_2) = (100*\cos(0), -100*\sin(0)) = (100, 0)$$

$$(x_3, y_3) = (100*\cos(45), -100*\sin(45)) = (70.71, -70.71)$$

$$(x_4, y_4) = (100*\cos(90), -100*\sin(90)) = (0, -100)$$

Equation 10 as shown above corresponds to the distance coordinates of the second loudspeaker 102*b* relative to the first loudspeaker 102*a*, where the angle of 0 is inserted into equation 5 and taken from the first row (i.e., S1) and second column (i.e., S2) from the first matrix 800. Equation 11 as shown above corresponds to the distance coordinates of the third loudspeaker 102*c* relative to the first loudspeaker 102*a*, where the angle of 45 is inserted into equation 8 and taken from the first row (i.e., S1) and second column (i.e., S3) from the first matrix 800. Equation 11 as shown above corresponds to the distance coordinates of the third loudspeaker 102*c* relative to the first loudspeaker 102*a*, where the angle of 90 is inserted into equation 12 and taken from the first row (i.e., S1) and third column (i.e., S3) from the first matrix 800.

Figure 16:
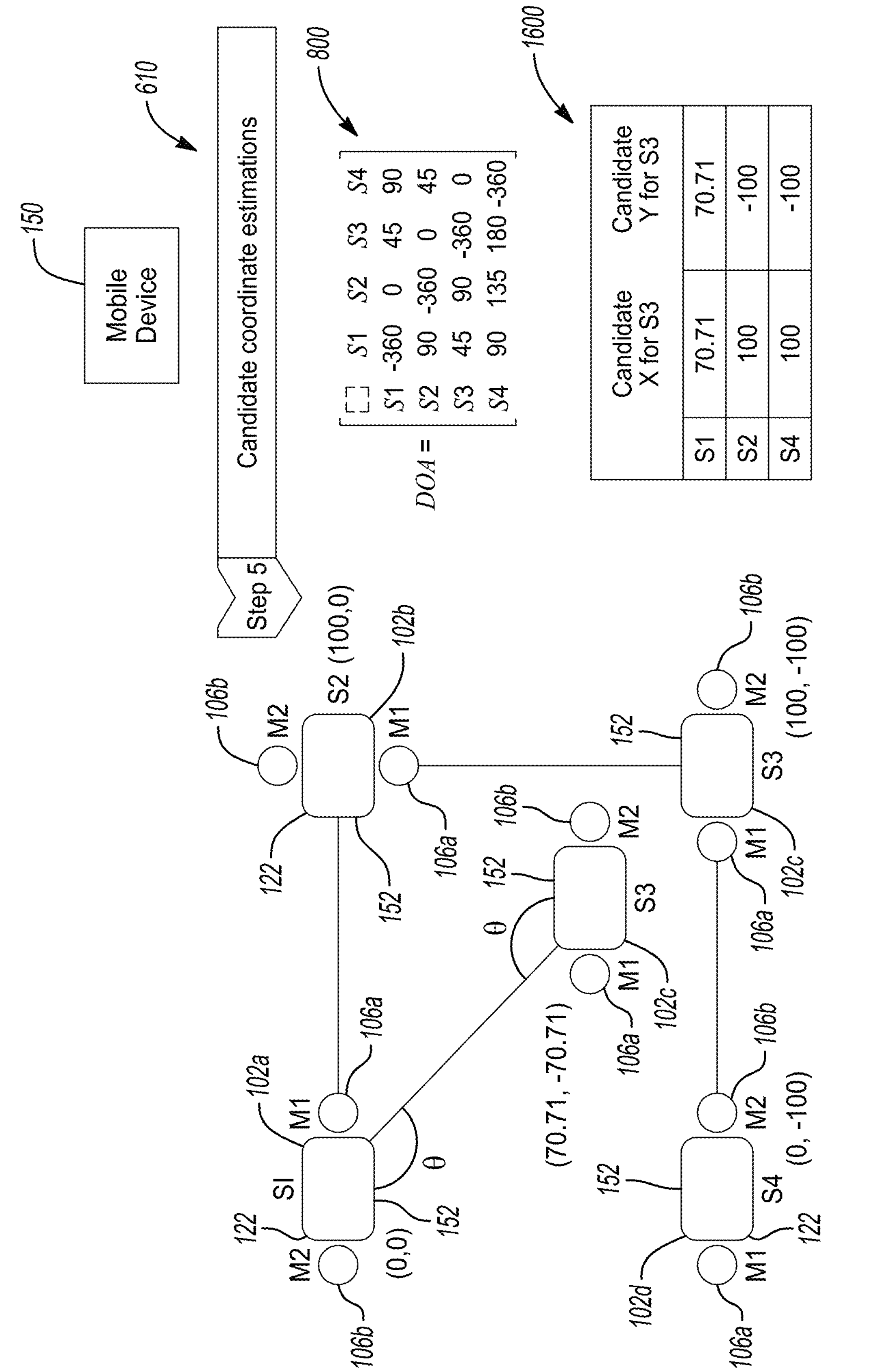
FIG. 16 depicts another example of the candidate coordinate estimation operation of the method of FIG. 6 being performed on the configuration of FIG. 7 in accordance with one embodiment.

FIGS. 16-20 depict various aspects of the candidate coordinate estimation operation 610 of the method 600 of FIG. 6 being performed on the configuration of FIG. 7 in accordance with one embodiment. FIG. 16 generally illustrates that an estimation of the layout of the third loudspeaker 102*c* is positioned relative to the first loudspeaker 102*a* at coordinates (70.71, −70.71) based on the execution of operation 608. However, the actual layout indicates that the third loudspeaker 102*c* is positioned at coordinates (70.71, −70.71) relative to the first loudspeaker 102*a*, the third loudspeaker 102*c* is positioned at coordinates (100, −100) relative to the second loudspeaker 102*b* and that the third loudspeaker 102*b* is positioned at coordinates (−100, −100) relative to the fourth loudspeaker 102*d*. These aspects are generally shown as candidate coordinate estimates 1600. FIG. 17 illustrates the manner in which the various coordinates are determined for the third loudspeaker 102*c* relative to the first, the second, and the fourth loudspeakers 102*a*-102*d* based on equations 10, 11, and 12 as discussed in connection with FIG. 15. In general, the mobile device 150 does not have knowledge of whether the coordinates of the third loudspeaker 102*c* is correct. In this case, the mobile device 150 estimates possible candidate points. In operation 612, the mobile device 150 calculates the error for each candidate point. The candidate that exhibits the lowest error is selected as the best coordinate. It is recognized that all DOA estimations from all of the loudspeakers 102 are transferred to the mobile device 150 utilizing any number of wireless communication protocols such as, but not limited to, Bluetooth, WiFi, etc. In the example, illustrated in FIG. 17, the mobile device 150 utilizes the angles from the calibrated angle matrix 902 in connection with determining the coordinates of the third loudspeaker 102*c* relative to the first, second and fourth loudspeakers 102*a*, 102*b*, and 102*d*.

Referring to FIG. 18, the mobile device 150 extends the candidate coordinate estimates 1600 by combining x and y points. As generally shown at 1800, the candidate coordinate estimates 1600 are provided in addition to extended candidate coordinate estimates 1802. In general, the candidate coordinate estimates reflect the x and y coordinates in the following manner: ($x_a$, $y_a$), ($x_b$, $y_b$), and ($x_c$, $y_c$) for the first, second, and fourth loudspeakers 102*a*, 102*b*, 102*d*, respectively. The extended candidate coordinate estimates 1802 reflect the x and y coordinates in the following manner: ($x_a$, $y_b$), ($x_c$, $y_z$) for the first and the second loudspeakers 102*a*, 102*b* and the fourth and the first loudspeakers 102*d*, 102*a*, respectively. The extended candidate coordinate estimates 1802 are extended in the manner illustrated at 1800 since some degree estimates provides information for, for example, one dimension (e.g., x, y coordinates). The mobile device 150 combines the coordinates to obtain the information in a two-dimensional format (e.g., x and y coordinates). The mobile device 150 generally assembles the candidate coordinate estimates 1600, the extended candidate coordinate estimates 1802 in addition to an extended angle as shown as 1804. The extended angle 1804 is generally estimated using the angle of the first loudspeaker 102*a* and the second loudspeaker 102*b* (e.g., S2 and S1) which corresponds to (100, −100). The first loudspeaker 102*a* and the third loudspeaker 102*c* from a line and coordinates (100, −100) is calculated using the intersection of these two lines. The angle information is used to form the lines. The mobile device 150 extends the candidates coordinate estimates to locate an intersection between the third loudspeaker 102*c*, to both the second loudspeaker 102*b* and the fourth loudspeaker 102*d*. The mobile device 150 does not take into account the third loudspeaker 102*c* for the candidate coordinate estimates 1600, the extended candidate coordinate estimates 1802, and the extended angle 1804 since the location of the third loudspeaker 102*c* is not correct. In general, it is not necessary for the mobile device 150 to ascertain if any location is correct or not. The figures as set forth herein are simply provided as examples. FIG. 18 discloses the operations for the third loudspeaker 102*c* as an example. In the overall method, these operations are applied for each loudspeaker 102 in the system 100.

Figure 19:
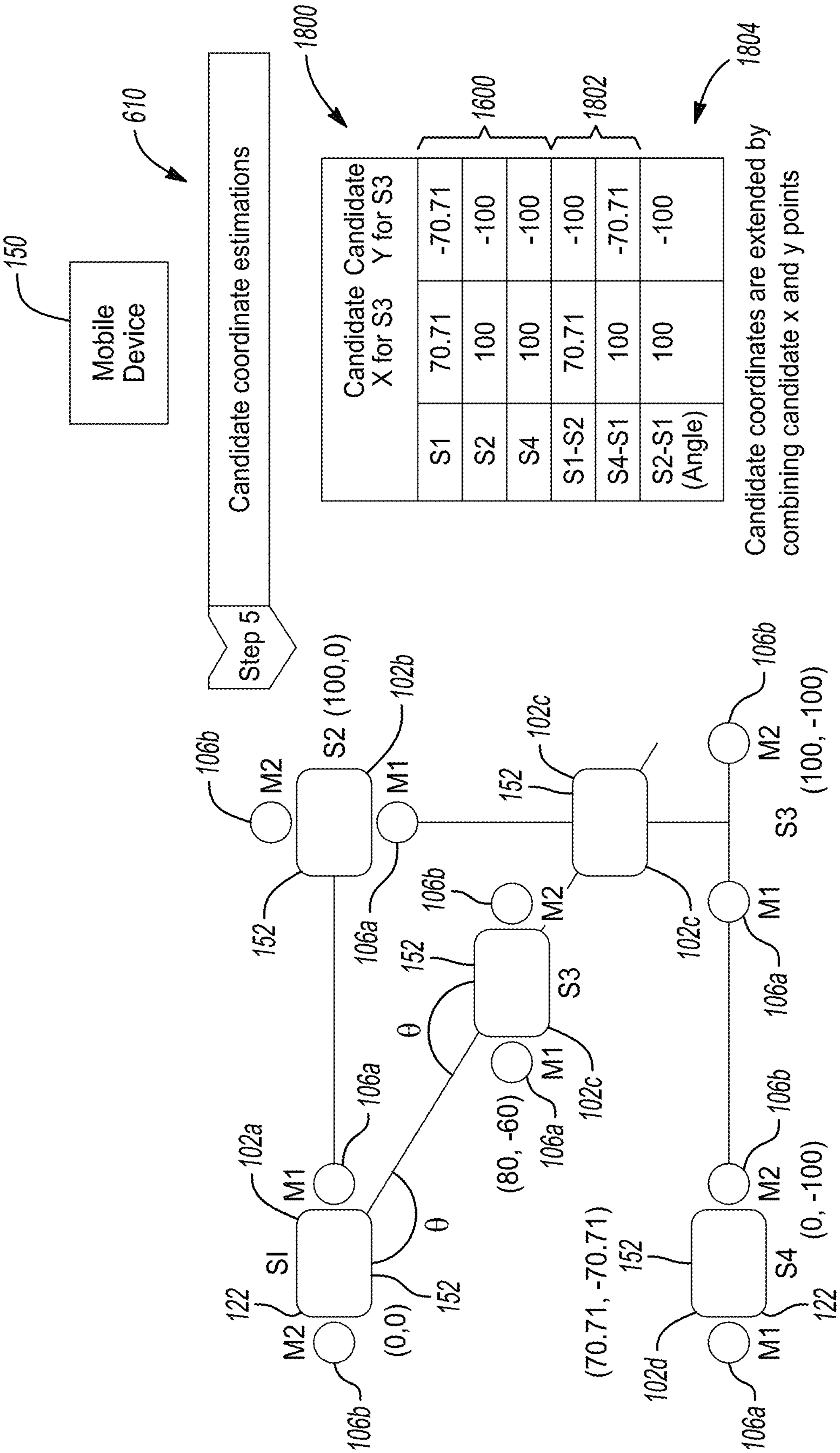
FIG. 19 depicts another example of the candidate coordinate estimation operation of the method of FIG. 6 being performed on the configuration of FIG. 7 in accordance with one embodiment.

Referring to FIG. 19, the mobile device 150 continues to extend the candidate coordinate estimates 1600. In this case, the example illustrated in connection for FIG. 19 is provided to simply illustrate another example of the extended candidate coordinate and the example illustrated in connection to FIG. 19 may not be related to the example shown above.

FIG. 20 depicts another example of the candidate coordinates estimations operation 610 being expected by the mobile device 150. FIG. 20 illustrates another example of a modified first matrix 800' and a modified blocked matrix 1100'. The modified first matrix 800' illustrates that there is an obstruction between the fourth loudspeaker 102*d* and the third loudspeaker 102*c* as exhibited by the angle of "145" in the third column (e.g., S3) and the fourth row (e.g., S4). In general, the method 600 may only tolerate a single outlier between any two loudspeakers for a four-loudspeaker layout configuration. In this case, the mobile device 150 determines that two or more outliers (e.g., the third loudspeaker 102*c* and the fourth loudspeaker 102*d*). The mobile device 150 determines that the third loudspeaker 102*c* is an outlier as discussed above in connection with operation 604. In this regard, the mobile device 150 also determines that the fourth loudspeaker 102*d* is an outlier also based on the description provided above in connection with operation 604. Given that more than one outlier is present, the mobile device 150 includes a user interface and commands the user to move any obstructions that are present with respect to the third loudspeaker 102*c* and the fourth loudspeaker 102*d*. Given that the third and the fourth loudspeakers 102*c* and 102*d* are outliers (i.e., have obstruction formed therebetween), the mobile device 150 does not take into account the estimations from the third loudspeaker 102*c* and the fourth loudspeaker 102*d* for the candidate coordinate estimates 1600 (and vice versa), the extended candidate coordinate estimates 1802, and the extended angle 1804 since there is an outlier between the locations of the third loudspeaker 102*c* and the fourth loudspeaker 102*d* and such estimations are considered not correct. The mobile device 150 updates the modified block matrix 1100' which illustrates that the third and the fourth loudspeakers 102*c* and 102*d* are blocked for consideration in the layout.

Figure 21:
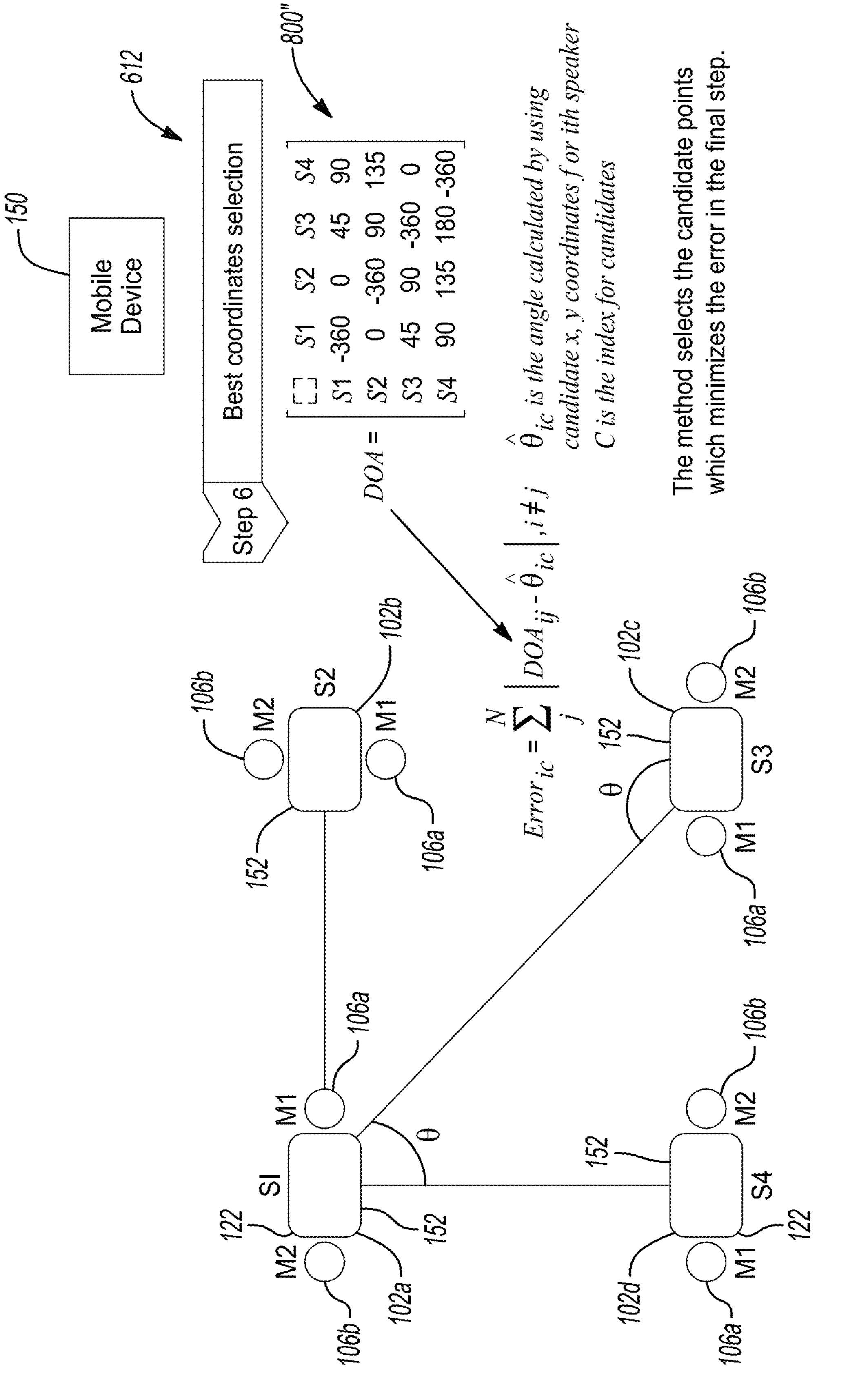
FIG. 21 depicts an example of the best coordination selection operation of the method of FIG. 6 being performed on the configuration of FIG. 7 in accordance with one embodiment.

FIGS. 21 and 22 depict an example of the best coordinate selection operation 612 of the method of FIG. 6 being performed on the configuration of FIG. 7 in accordance with one embodiment. The mobile device 150 performs the best coordinate selection operation 612. For example, the mobile device 150 executes the following equation (13):

$$\text{Error}_{iC} = \sum_{j}^{N} \left| DOA_{ij} - \hat{\theta}_{iC} \right|, \; i \neq j$$

where $\hat{\theta}_{iC}$ is the angle calculated by using candidate x and y coordinates for an ith loudspeaker and C corresponds to an index for candidates. The mobile device 150 selects candidate points that minimize an error. The calibrated DOA matrix 800 is set forth above is used as $DOA_{ij}$ in the above equation.

FIG. 22 generally illustrates an example in terms of the manner in which equation 13 is executed. It is recognized that $\hat{\theta}_{iC}$ as shown in FIG. 22 may be obtained by the following equation:

$$\hat{\theta}_{iC} = \frac{y_c - y_i}{x_c - x_i}$$

The mobile device 150 determines the error for the third loudspeaker and the first loudspeaker 102*c* and 102*a*, respectively based on equation 13:

$$\text{Error31} = |45 - 45| + |90 - 150| + |0 - 20| = 80$$

Similar, the mobile device 150 determines the error for the third loudspeaker and the second loudspeaker 102*c*, and 102*b*, respectively also based on equation 10:

$$\text{Error32} = |45 - 45| + |0 - 0| + |180 - 180| = 0$$

FIG. 22 illustrates the manner in which equation 10 can be used for first two rows in the table in FIG. 22 for third speaker location estimation. $\hat{\theta}_{3C}$ comes from the second term in equation 5. $\hat{\theta}_{3C}$ as shown in the table of FIG. 22 represents the angle between the speakers 102 and candidate points.

Figure 23:
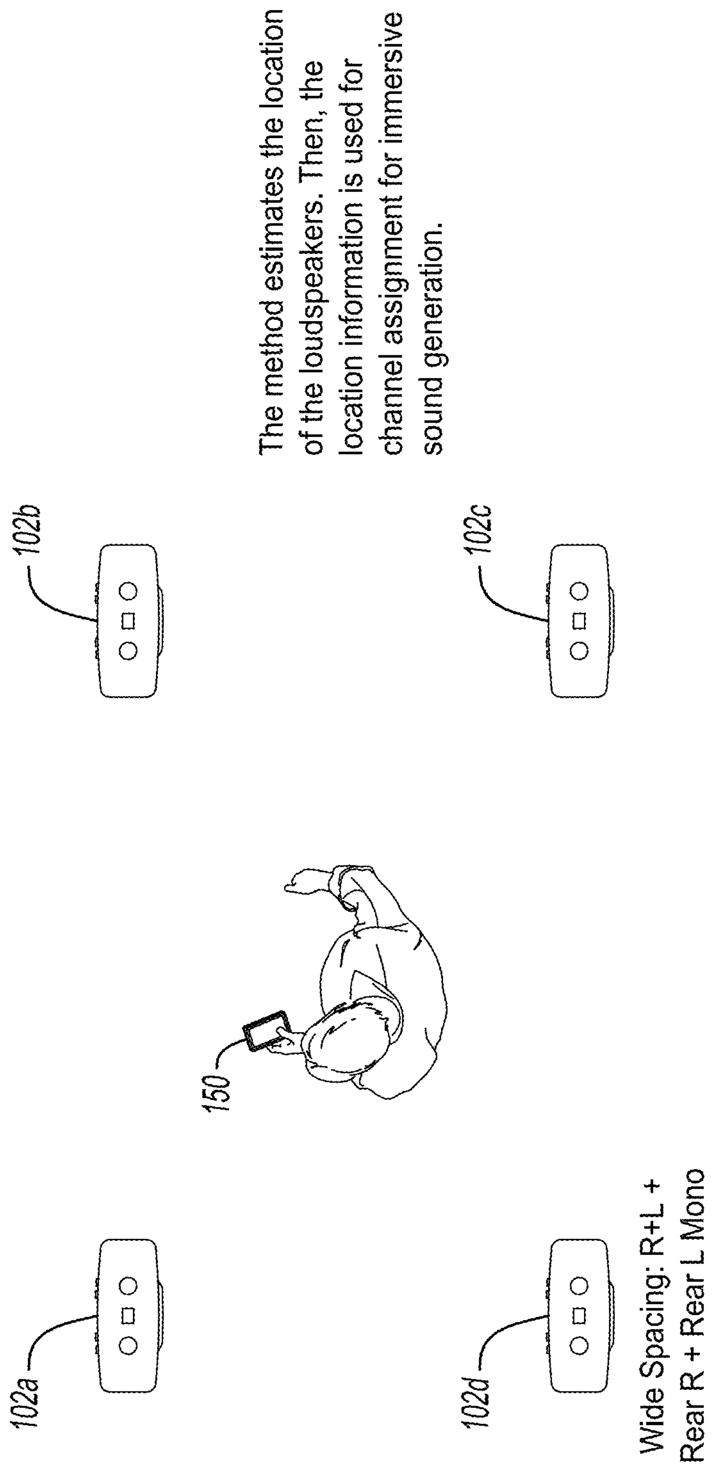
FIG. 23 depicts one example of the microphone orientation and loudspeaker estimation in accordance with one embodiment.

FIG. 23 depicts one example of the microphone orientation and loudspeaker estimation method 600 in accordance with one embodiment. FIG. 23 the locations of the loudspeakers 102*a*-102*d* in the listening room 151 (or listening environment). The mobile device 150 may display the location of the loudspeaker 102*a*-102*d* (e.g., front, left, right, and rear) as arranged within the listening room. In general, the system 100 and/or method 600 determines the locations of the first, second, third, and fourth loudspeakers 102*a*-102*d* in the listening environment 151 based on the methods at least shown in connection with FIGS. 6-22. The system 100 and/or method 600 utilize the location information to provide channel assignment for immersive sound generation with respect to the loudspeakers 102*a*-102*d*. For example, the mobile device 150 utilizes the final DOAs to assign the loudspeakers 102*a*-102*d* as front, left, right, and rear loudspeaker locations.

System and Method for Boundary Distance Estimation

As exhibited above, the first, second, third and fourth loudspeakers 102*a*-102*d* generally from a series of products all of which are equipped with microphones 106*a*-106*b* mounted thereon. The microphones 106*a*-106*b* for each loudspeaker 102 provide an ability to detect the location of an audio source (e.g., the mobile device 150) with respect to any nearby wall. However, since the microphones 106*a*-106*b* may be in a linear arrangement when packaged on a corresponding loudspeaker 102, the microphones 106*a*-106*b* may lack the ability to discriminate the audio source that is in a front or rear of the loudspeaker based on using a line between the microphones 106*a*-106*b* as the line of symmetry. Detecting a wall or barrier in one of the directions may eliminate the symmetry limitation.

Also, if a loudspeaker is placed too closed to a wall or to a corner, it may not be possible to detect the loudspeaker. The disclosed system may detect if a loudspeaker is placed too close to the wall and to automatically correct for the loudspeaker being positioned to close to the wall to ensure the desired sound field is transmitted in the room (or the listening environment 151). In general, loudspeaker close to the wall can have effects of +/−3 dB at low frequencies. Also, the disclosed system and method may be used for an improved audio upmix. Aspects disclosed herein may provide, for example, a circular microphone array having six microphones capable of detecting all surrounding walls using the disclosed method. At that point, the disclosed method may determine whether a left or right wall is the surrounding wall to the microphone by comparing the proximity to the walls to each microphone. At that point, the system may perform channel assignment that may be used for upmixing that can be performed automatically. In addition, the disclosed system and method may obtain the room characteristics and estimate the distance to the wall or a reflector.

Room impulse response (RIR) generally provides an audio fingerprint of a location in an acoustic environment. There may be a variety of applications of RIR, such as wall boundary estimation, digitally reconstructing the acoustic environment for pro-audio applications, room correction, and frequency response correction for the playback system. The measurement of RIR includes exciting the room (or listening environment) may be performed by, but not limited to, clapping hands. The measurement of RIR may also include deconvolving an audio signal to obtain room characteristics. RIR may involves the reflections after exciting the room. Reverberation may refer to the audio reflections that reflect back to the audio source. The reverberations are generally not direct sound, so the reverberations arrive later to the microphone. The reverberation amplitude and the time to come back depending on the material of the surfaces and the number of the reflected area. The sound continues to reflect until the sound loses its energy due to absorption.

Figure 24:
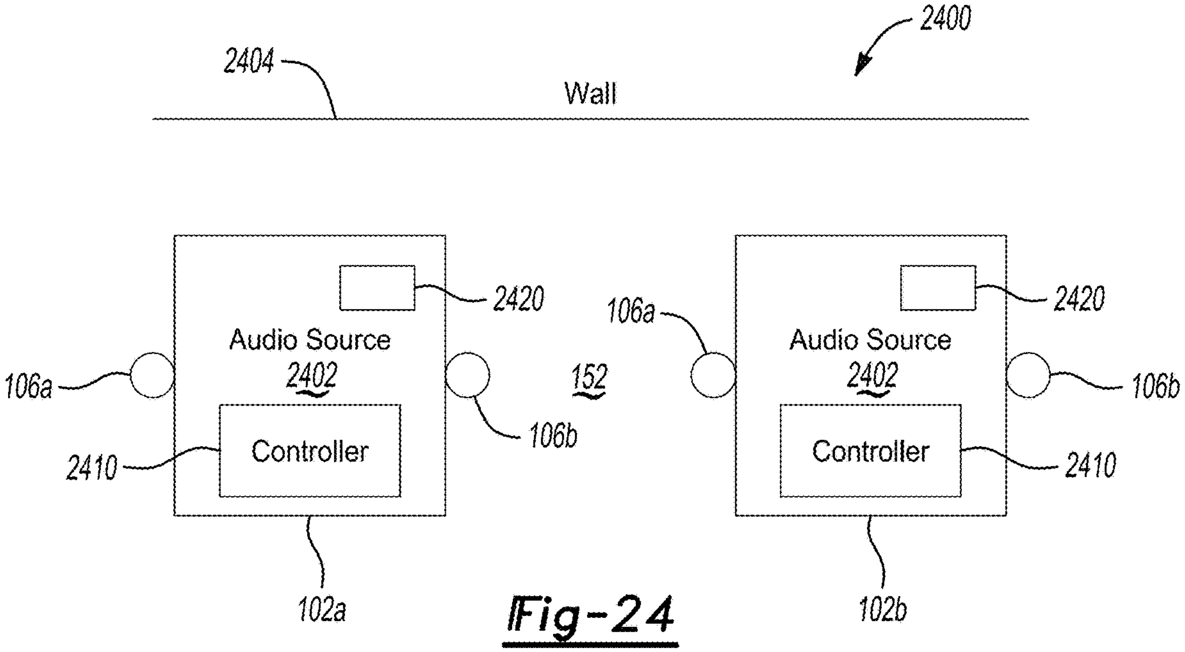
FIG. 24 depicts a system for performing a boundary estimation in accordance with one embodiment.

FIG. 24 depicts a system 2400 for performing a boundary estimation in accordance with one embodiment. The system 2400 generally includes the first loudspeaker 102*a* and the second loudspeaker 102*b*. Each of the loudspeakers 102*a*, 102*b* generally include and an audio source 2402. While only the first and second loudspeakers 102*a*-102*b* are shown, it is recognized that any number of loudspeakers may be positioned in the listening environment. The audio source 2402 may be integrated within any one of the loudspeakers 102*a*, 102*b* to directly transmit audio from the particular loudspeaker 102 into the listening environment 151.

The first loudspeaker 102*a* and the second loudspeaker 102*b* are located a distance away from a wall 2404. In general, it is desirable to understand the distance of the first and/or the second loudspeakers 102*a*-102*b* from the wall 2404 in the listening environment 151. If one or more of the first and the second loudspeakers 102*a*-102*b* are placed too close to the wall 2404, such a condition may be difficult for the audio source 2402 to automatically correct for the location of the wall 204 relative to the loudspeakers 102*a*-102*b* to ensure the desired sound field is transmitted into the room (or the listening environment 151). In general, the first and/or the second loudspeaker 102*a*, respectively, if positioned too close to the wall 2404, may cause effects of +/−3 dB at low frequencies. The audio source 2402 (i.e., within the loudspeaker 102*a* and/or the loudspeaker 102*b*) may determine the location of the first and/or second loudspeakers 102*a*-102*b* relative to the wall 2404 and employ a corrective mechanism to account for the distance of the first and/or second loudspeakers 102*a*-102*b* being positioned to close to the wall 2404. The system 2400 may improve channel assignment using more than two microphones 106*a* by employing the corrective mechanism to account for the close proximity of the loudspeakers 102*a*-102*b* to the wall 2404. The ability to perform channel assignment (e.g., which loudspeaker is front left/front right/rear, etc.) properly enables audio upmixing. It is recognized that the audio source 2402 may include any number of controllers 2410 (hereafter "the controller 2410") to perform the operations noted herein. While the audio source 2402 may determine the distance of the first and/or the second loudspeakers 102*a*-102*b* relative to the wall 2404, it is recognized the any one or more of the first loudspeaker 102*a* or the second loudspeaker 102*b* may also include at least one controller 2412 to determine the distance of the loudspeakers 102*a*, 102*b* relative to the wall 2404.

The controller 2410 may employ, for example, a predetermined measurement scheme such as RIR to provide and transmit an audio fingerprint in the listening environment 151. For example, the controller 2410 may include a driver (not shown) to transmit the audio fingerprint into the listening environment 151. The controller 2410 may also include memory to store the audio fingerprint. The system 2400 may employ a variety of applications of RIR, such as wall boundary estimation, digitally reconstructing the acoustic environment for pro-audio applications, room correction, and frequency response correction for the playback system. In one example, the audio source 2402 may excite the room (or the listening environment 151) by transmitting an audio signal and perform and the measurement of RIR may also include deconvolving an audio signal to obtain room characteristics. As noted above, RIR may involve performing measurements of a captured audio fingerprint (i.e., reflections) after exciting the listening room 151 has been excited. Reverberation may refer to the audio reflections that reflect back to the audio source 2402. The audio source 2402 maybe coupled to the microphone 106*a* and 106*b* to receive the captured reflections (or reverberations) from the listening environment 151. The reverberations as received back by the audio source 2402 are generally not direct sound, so the reverberations arrive at a time later to the microphone 106. The amplitude of the reverberation and the time for the reverberation to arrive at audio source 2402 depends on the material of the surfaces within the listening environment 151 and the number of the reflected area. The sound continues to reflect until the sound loses its energy due to absorption within the listening environment 151.

The audio source 2204 may excite the listening environment 151 by transmitting an audio signal that includes an exponential sine sweep (ESS) (or ESS signal). The ESS signal may be more advantageous over an impulse response measurement method since (i) the ESS signal has better noise rejection than a maximum length sequence (MLS) method for a signal that is transmitting at a same length as that of the MLS, and (ii) the ESS signal may be more robust than non-linear effects given that the driver directly transmits the ESS signal The equation below may be provided for ESS signal:

$$s(t) = \sin(\theta(t)) = \sin\left(K \cdot \left(e^{-\frac{t}{L}} - 1\right)\right) \tag{9}$$

Where:

$$K = \frac{\omega_1 T}{\ln\left(\frac{\omega_1}{\omega_2}\right)},\ L = \frac{T}{\ln\left(\frac{\omega_1}{\omega_2}\right)} \tag{10}$$

T denotes a time duration of the sweep. Variables $\omega_1$ and $\omega_2$ correspond to a start and end frequency, respectively.

Since the frequencies for the ESS's varies, energy may depend on a rate of the instantaneous frequency which is given below:

$$\omega(t) = \frac{d\{\theta(t)\}}{dt} = \frac{K}{L} \cdot e^{\frac{t}{L}} \tag{11}$$

Figure 25:
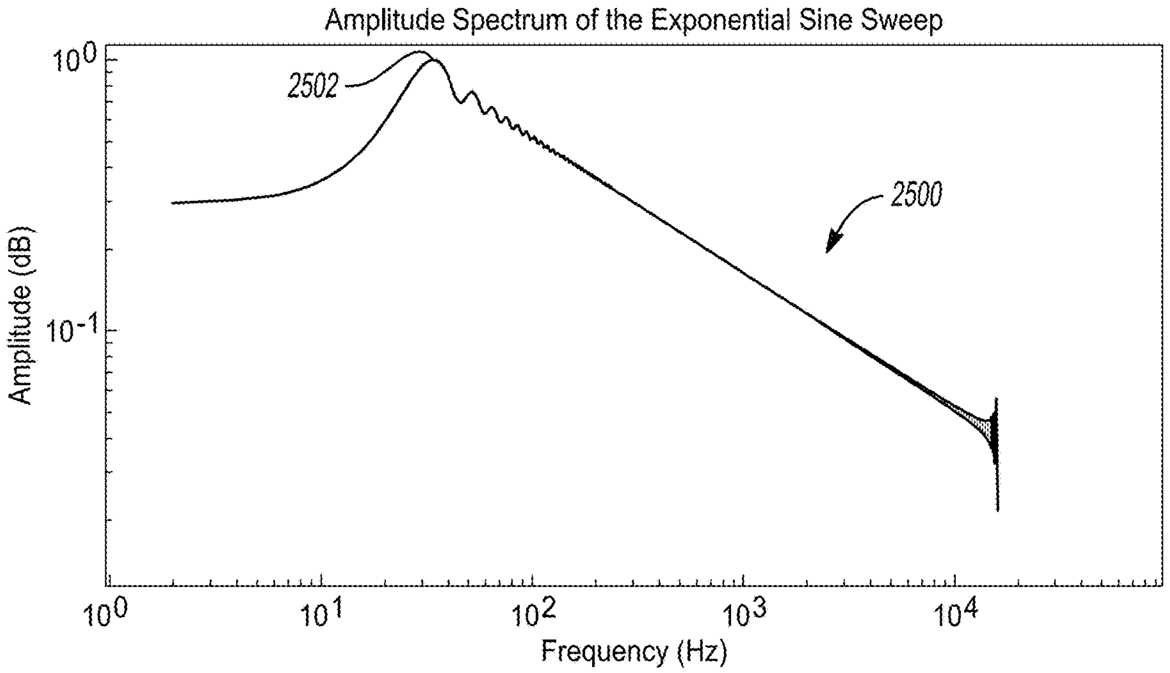
FIG. 25 depicts one example of a frequency response for an exponential sine sweep (ESS) that is used to excite the listening environment in accordance with one embodiment.

FIG. 25 generally illustrates a frequency response for an ESS signal 2500. The ESS signal 2500 includes a peak 2502 thereof as the signal 2500 is transmitted from the audio source 2402 to one or more of the first and the second loudspeakers 102*a*, 102*b*.

The audio source 2402 may employ inverse filtering or deconvolution to measure the RIR after the first and/or the second loudspeakers 102*a*, 102*b* plays the EES signal 2500 in the listening environment 151. Then the controller 2410 employs inverse filtering and extracts the RIR. As noted above, the audio source 2402 includes any number of microphones 2420 to record the ESS signal 2500. The audio source 2402 may then extract or measure the RIR from the recorded ESS signal 2500. A time reversed energy for the ESS signal 2500 decreases, for example, at 3 db/octave, an inverse filter, for example, has 3 dB/octave increase in its energy spectrum to achieve a flat spectrogram. Assume h(t) is a room impulse response, r(t) is the excited room impulse response, and f(t) is the inverse filter.

$$h(t) = r(t) * f(t) \tag{13}$$

f(t) can be created using post-modulation, which is applying amplitude modulation envelope of +6 dB/octave to the spectrum of the time reversed signal. The general form of the post-modulation function is as follows:

$$m(t) = \frac{A}{\omega(t)} = A\left(\frac{K}{L}e^{t/L}\right)^{-1} \tag{14}$$

A denotes the constant for the modulation function. For time t=0, ω(t)=$w_1$, and for obtaining a unity gain at time t=0:

$$1 = \frac{A}{\omega(0)} = \frac{A}{\omega\_1} \rightarrow A = \omega_1 \tag{15}$$

Figure 26:
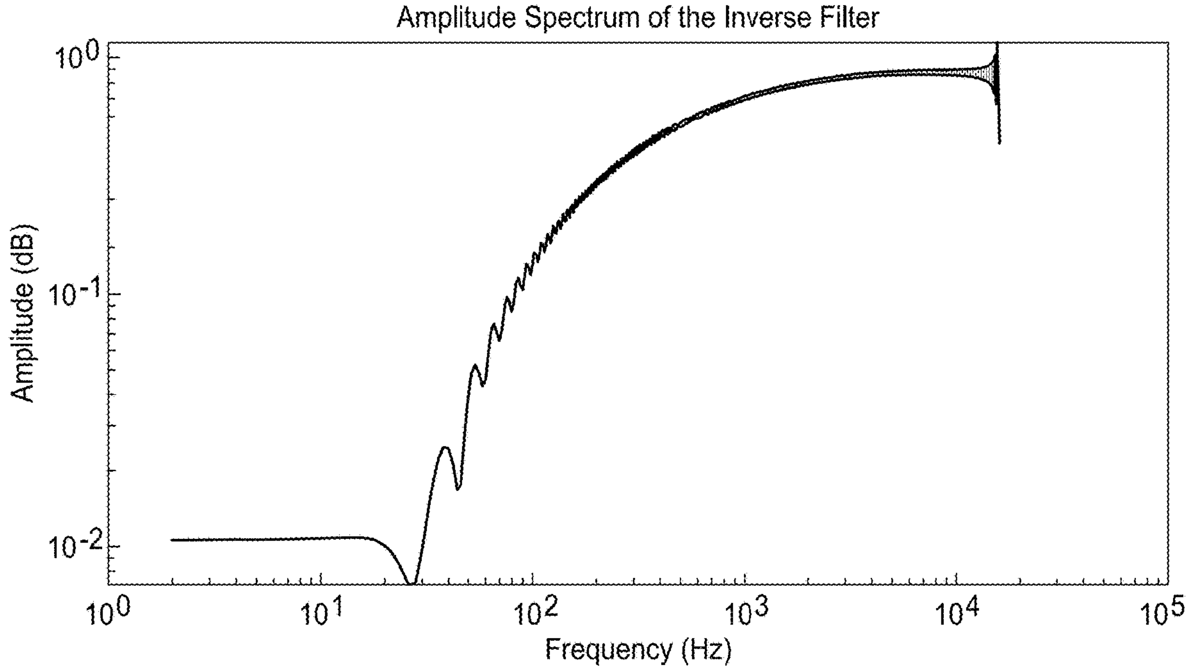
FIG. 26 depicts an example of an amplitude spectrum for an inverse filter in accordance with one embodiment.

Then, the modulation function becomes:

$$m(t) = \frac{\omega_1}{\omega(t)} \tag{16}$$

f(t) now has 3 db/octave increase in frequency after modulating the time reversed signal with m(t). FIG. 26 illustrates an amplitude spectrum for the inverse filter.

In general, the measured RIR is obtained by the audio source 2402 by utilizing equation 13. Thus, the aspects related to equation 13 correspond to a convolution of the ESS signal and the inverse filter. The audio source 2402 may utilize the measured RIR to estimate the distance of the first and/or second loudspeakers 102*a*, 102*b* to the wall 2404. It is recognized that the audio source 2402 for a given loudspeaker 102*a* and 102*b* determines the distance for each loudspeaker 102*a* and 102*b* that the audio source 2402 is positioned in. In general, since the measured RIR comprises reverberations from multiple objects in the listening environment 151 (or room), the wall proximity estimation as utilized by the audio source 2402 may be sophisticated.

Figure 27:
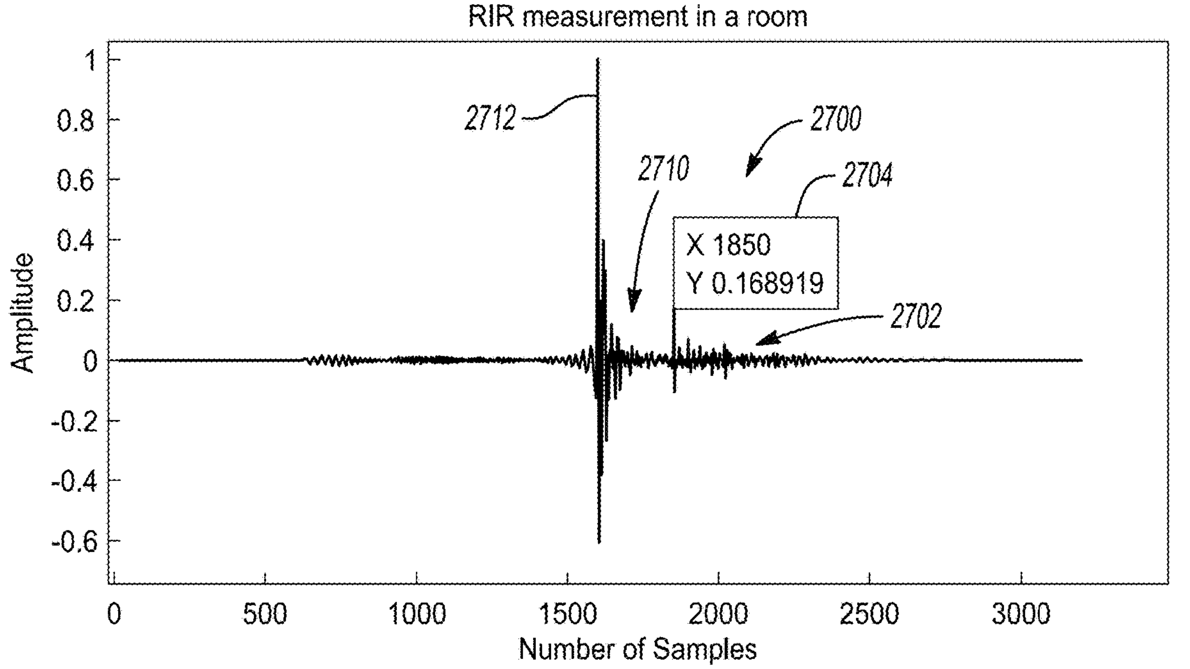
FIG. 27 depicts one example of a Room Impulse Response (RIR) measurement in accordance with one embodiment.

FIG. 27 generally illustrates on example of a plot 2700 corresponding to an RIR measurement as performed by the audio source 2402. As shown, the RIR measurement 2700 includes a plurality of peaks 2702. The peaks 2702 may correspond to reflections or reverberations of the ESS signal from various objects in the listening environment 151. A reverberation number of 1850 is generally shown at 2704. The reverberation number of 1850 generally corresponds to a strong candidate for the reverberation of the ESS signal from the wall 2404. This condition may be verified since an amplitude of the peak is highest after a gap 2710 is shown between a highest peak 2712 and the reverberation number of 1850 as shown at 2704. The highest peak 2172 generally represents the direct path of the ESS signal from the loudspeaker 102 to the microphone 2420. In addition, this condition may also be verified since peak amplitude associated with 2704 may correspond to a material of the wall 2404. In general, the peak from the wall 2404 may not be obvious as illustrated in FIG. 27. In addition, the nonlinearity attributed to the peaks 2702 may be caused by due to the driver (or amplifier) in the audio source 2402. For example, the amplifier generally causes spurious peaks in the RIR measurement performed by the audio source 2402. Thus, the audio source 2402 may need to take these conditions into account when performing the RIR measurement.

The audio source 2402 may overcome the noted issues above to perform wall distance estimation by (i) sampling or extracting peaks in the RIR measurement to avoid spurious peaks (or ringing) which are strong and close to the peaks to be detected around the peaks 2702 which may cause erroneous estimations, and/or (ii) score each peak to determine a correct peak from the wall 2404. It is recognized that there are undesired peaks around the peaks 2702 due to nonlinearity and it is desirable to avoid such peaks in the RIR measurement. In general, the peaks 2702 in the RIR measurement may correspond to a direct path from the audio source 2402 to the microphone 2420 and from the reflector to the microphone 2420 on the audio source 2402). It may be observed that there is ringing around the peaks in a closer look at the RIR measurement. The audio source 2402 may extract peaks to detect impulse events. Thus, in this regard the audio source 2402 may utilize a sliding window to extract the peak in each window. The audio source 2402 may find each peak in the window after the max peak in the RIR measurement is obtained and ignores the other peaks in the RIR measurement.

Figure 28:
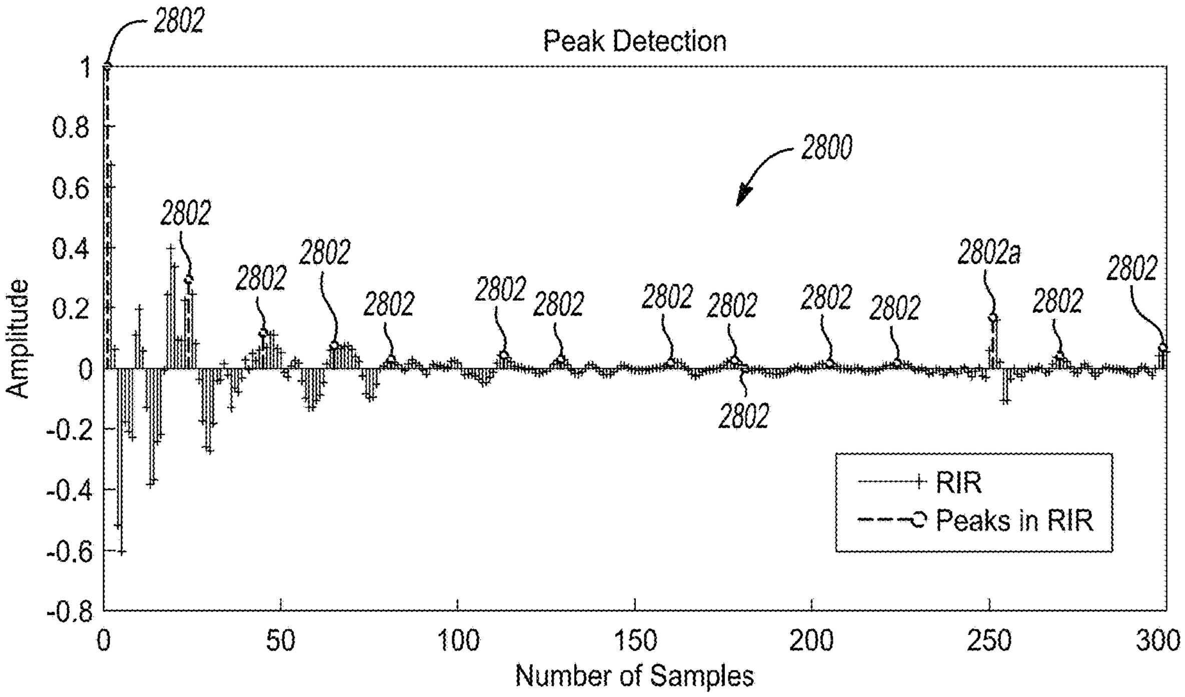
FIG. 28 depicts one example of peak detection involving the RIR measurement in accordance with one embodiment.

FIG. 28 generally illustrates the RIR measurement 2800 having detected peaks 2802 by the audio source 2402 in accordance with one embodiment. FIG. 28 also illustrates that the ringing as noted above in connection with FIG. 27 is more pronounced or obvious. The audio source 2402 obtains the RIR measurement 2800 when the distance the first loudspeaker 102*a* and/or the second loudspeaker 102*b* to the wall to is 137 cm for a 32 kHz sampling rate. The distance of the loudspeaker to the wall may be obtained based on the following equation:

$$\hat{d} = \frac{(\text{index of estimated peak} - \text{index of max peak})}{2 * \text{sampling frequency}} \times \text{Speed of Sound} \quad (17)$$

For example, the "index of estimated peak" as set forth above in equation 17 generally corresponds to the estimate peak in the RIR measurement 2800. Thus, in this regard, the detected peak 2802*a* as shown in FIG. 28 corresponds to sample 251 which may be defined as the index of estimated peak. The "index of max peak" may generally correspond to 0. FIG. 28 generally depicts a trimmed version of the RIR measurement that is shown in FIG. 27. For example, the highest peak 2712 as shown in FIG. 27 generally corresponds to the highest peak 2802 as shown at 0 on the x-axis of the plot of FIG. 28. Similarly, constant value of "2" as set forth in equation 17 generally corresponds from the round-trip time. When the audio source 2402 plays the ESS signal, the sound (or the ESS signal) comes into contact with the wall 2404 and reflects back to the audio source 2402. Hence, the ESS signal takes the same distance or path twice. Thus, in this regard, the explains why the constant value is set to 2. For the RIR measurement 2800 as illustrated in FIG. 28, the audio source 2402 determines that the distance is between the wall 2404 and the first loudspeaker 102*a* or the second loudspeaker 102*b* is, for example, 137 cm for a 32 kHz sampling rate utilizing equation 17 from above if the audio source 2402 correctly estimates the peak at sample 251.

The audio source 2402 tracks an overall trend in the peaks 2802 of the RIR measurement 2800 to estimate the peaks of the reverberation of the RIR measurement 2800. For example, if the ESS signal as transmitted by the audio source 2402 does not encounter the wall 2404 or an object in the listening environment 151, then the anticipated trend of the peaks 2802 of the RIR measurement would illustrate or corresponding to an overall decrease in peaks (i.e., a decreasing trend). If the ESS signal as transmitted by the audio source 2402 does encounter the wall 2404 or an object in the listening environment 151, then the anticipated trend of the peaks 2802 of the RIR measurement would illustrate a decreasing trend of peaks 2802 followed by an increased trend in peaks which are then followed by a decreasing trend in peaks 2802. In general, the audio source 2402 stores information corresponding to the peaks 2802 as received for the RIR measurement to determine if there is only a decreasing trend of peaks 2802 that continually decrease over time or if there is a decreasing trend of peaks 2802 followed by an increasing peak 2802*a*. The audio source 2402 may then establish a confidence score that is calculated by using, for example, a percentage increase that is multiplied by, for example, a value of 1.01 to the number of negative peaks 2802. The audio source 2402 may then select a predetermined number of peaks that have the highest confidence score (i.e., maximum score) or level (e.g., 20) and then locates a maximum peak among the selected peaks 2802. Such a maximum peak may correspond to the peak that exhibits the largest amplitude on the RIR measurement and may be positive after a long series of decreasing peaks. In this case, the maximum peak may be selected as the sample number (e.g., 251) which is then utilized by the audio source 2402 for insertion into equation 17 as provided above to find the distance of the loudspeaker 102*a* or 102*b* from the wall 2404.

Figure 29:
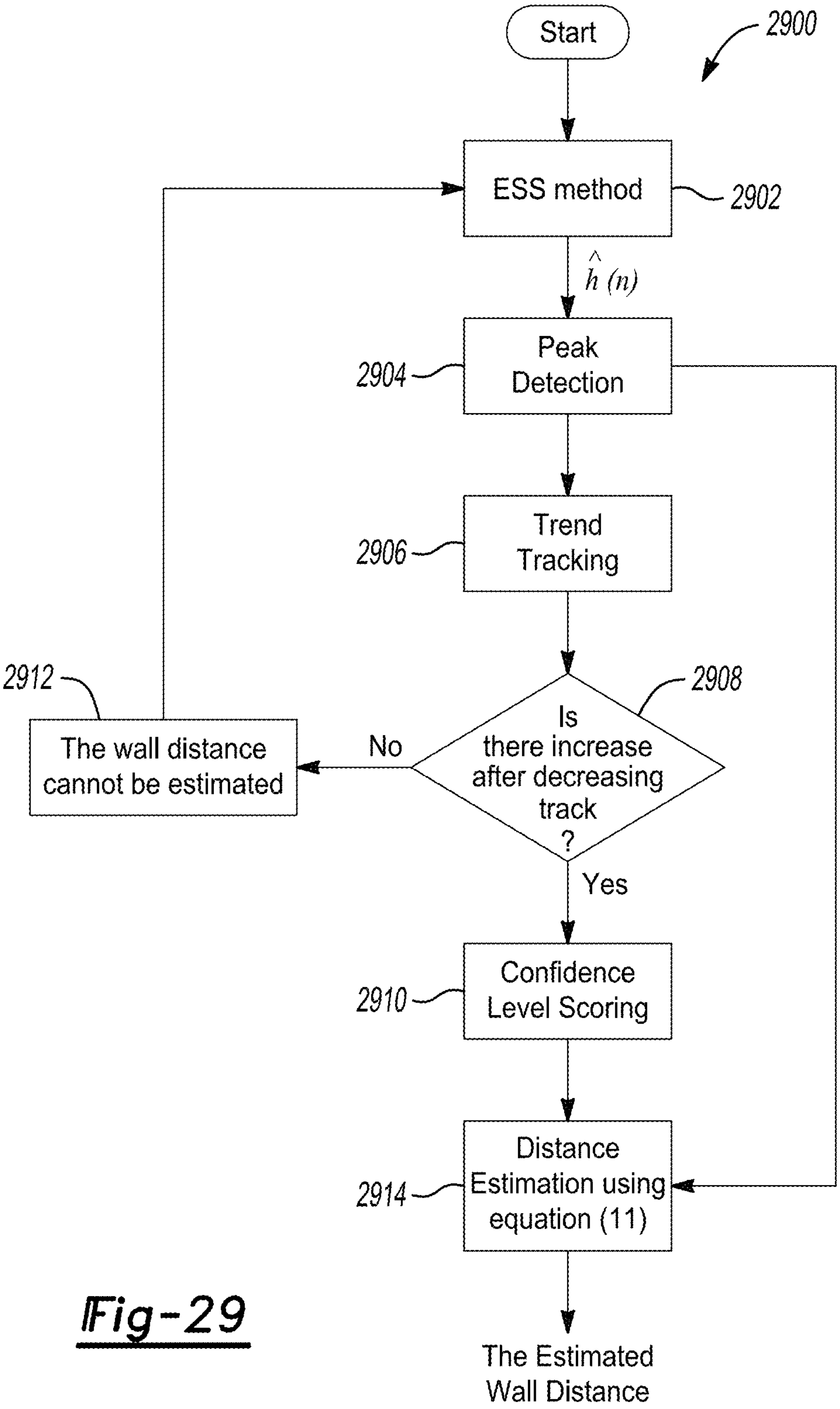
FIG. 29 depicts a method for performing a boundary estimation involving a plurality of loudspeakers in accordance with one embodiment.

FIG. 29 depicts a method 2900 for performing a boundary estimation involving a plurality of loudspeakers 102 in accordance with one embodiment. In operation 2902, the audio source 2402 transmits an audio signal in the form of an ESS signal into the listening environment 151. It is recognized that the audio source 2402 may transmit the ESS signal from each loudspeaker 102 positioned in the listening environment 151 one at a time and perform the operation of method 2900 for each loudspeaker 102 to determine the distance of the loudspeaker 102 relative to the wall 2404. Each audio source 2402 determines the distance for its corresponding loudspeaker 102*a*, 102*b* with respect to the wall 2404. It is recognized that each loudspeaker 102*a*, 102*b* may also transmit the distance information to the mobile device 150 or other device that may require such information so that the mobile device or other audio source may compensate the audio output to mitigate any one or more of the loudspeakers 102*a*, 102*b* from being too close to the wall 2404.

In operation 2904, the audio source 2402 receives reverberations from the listening environment 151 in response to transmitting the ESS signal. In this case, the audio source 2402 detects the peaks 2802 of the reverberations in the RIR measurement 2800 and stores information corresponding to the peaks 2802 in memory thereof. In operation 2906, the audio source 2402 performs trend tracking of the peaks 2802.

In operation 2908, the audio source 2402 assesses the stored peaks 2802 of the reverberations to determine if there is only a decreasing trend of peaks 2802 that continually decrease over time in the RIR measurement or if there is a decreasing trend of peaks 2802 followed by an increasing peak 2802*a* in the RIR measurement. If the audio source 2402 determines that the peaks 2802 do not increase over time, then the method 2900 moves to operation 2912 and determines that the wall distance of the first or the second loudspeaker 102*a* or 102*b* cannot be determined. In this case, the method 2900 may move back to operation 2902. If the audio source 2402 determines that there is an increasing peak 2802*a* in the RIR measurement, then the method 2900 moves to operation 2910.

In operation 2910, the audio source 2402 establishes a confidence score that is calculated by using, for example, a percentage increase that is multiplied by, for example, a value of 1.01 to the number of negative peaks 2802. The audio source 2402 may then select a predetermined number of peaks that have the highest confidence score or level (e.g., 20) and then locate a maximum peak among the selected peaks 2802. Such a maximum peak may correspond to the peak 2802*a* that exhibits the largest amplitude on the RIR measurement and may be positive after a long series of decreasing peaks 2802. In operation 2912, the audio source 2402 applies the maximum peak to the distance equation (e.g., equation 17) and also applies the other variables as noted above in connection with equation 17 to determine the distance of the first loudspeaker 102*a* or the second loudspeaker 102*b* relative to the wall 2404.

It is recognized that the controllers as disclosed herein may include various microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, such controllers as disclosed utilizes one or more microprocessors to execute a computer-program that is embodied in a non-transitory computer readable medium that is programmed to perform any number of the functions as disclosed. Further, the controller(s) as provided herein includes a housing and the various number of microprocessors, integrated circuits, and memory devices ((e.g., FLASH, random access memory (RAM), read only memory (ROM), electrically programmable read only memory (EPROM), electrically erasable programmable read only memory (EEPROM)) positioned within the housing. The controller(s) as disclosed also include hardware-based inputs and outputs for receiving and transmitting data, respectively from and to other hardware-based devices as discussed herein.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An audio system comprising:

a plurality of loudspeakers capable of being positioned in a listening environment and being arranged to transmit an audio signal in the listening environment, each loudspeaker being programmed to determine angle information of the audio signal as received at the loudspeaker relative to other loudspeakers of the plurality of loudspeakers and to transmit a first signal indicative of the angle information; and a mobile device programmed to receive the first signal from each of the loudspeakers and to determine a location for each loudspeaker in the listening environment based at least on the angle information, wherein each loudspeaker of the plurality of loudspeakers includes at least two microphones positioned thereon and being spaced apart from one another to receive the audio signal from the other loudspeakers of the plurality of loudspeakers, and wherein the mobile device is further programmed to store the angle information and to determine an orientation of the at least two microphones for each loudspeaker relative to one another based at least on the angle information.

2. The audio system of claim 1, wherein the mobile device is further programmed to determine that the orientation of the at least two microphones for each loudspeaker is one of in a same plane relative to other loudspeakers or in a different plane for at least one of the loudspeakers relative to the other loudspeakers based at least on angles for the plurality of loudspeakers.

3. The audio system of claim 1, wherein the mobile device is further programmed to determine that any one or more of the plurality of loudspeakers correspond to an outlier which is indicative of the loudspeaker providing erroneous angle information or an obstruction that is present proximate to the loudspeaker based at least on the angle information exceeding a predetermined threshold.

4. The audio system of claim 3, wherein the mobile device is further programmed to prompt a user to move the obstruction positioned proximate to the loudspeaker that is determined to be the outlier.

5. The audio system of claim 1, wherein the mobile device is further programmed to select one or more loudspeakers of the plurality of loudspeakers as a reference loudspeaker and to arbitrarily select reference coordinates for the other loudspeakers relative to the reference loudspeaker.

6. The audio system of claim 5, wherein the mobile device is further programmed to determine estimated distance coordinates for each of the other loudspeakers based at least on the angle information and the reference coordinates.

7. The audio system of claim 6, wherein the mobile device is further programmed to extend candidate coordinate estimates for at least one loudspeaker of the plurality of loudspeakers and to provide an extended angle to provide an intersection between at least two of the loudspeakers.

8. The audio system of claim 7, wherein the mobile device is further programmed to determine an error based at least on the extended candidate coordinate estimates and on an angle based on the extended coordinate estimates to select a final candidate for the location of the at least one loudspeaker.

9. A method comprising:

transmitting, via a plurality of loudspeakers capable of being positioned in a listening environment, an audio signal in the listening environment, determining, by each loudspeaker, angle information of the audio signal as received at each loudspeaker relative to other loudspeakers of the plurality of loudspeakers and transmitting a first signal indicative of the angle information;

receiving, at a mobile device, the first signal from each of the loudspeakers and to determine a location for each loudspeaker in the listening environment based at least on the angle information, wherein each loudspeaker of the plurality of loudspeakers includes at least two microphones positioned thereon and being spaced apart from one another to receive the audio signal from the other loudspeakers of the plurality of loudspeakers, storing at the mobile device, the angle information; and determining an orientation of the at least two microphones for each loudspeaker relative to one another based at least on the angle information.

10. The method of claim 9, further comprising determining that the orientation of the at least two microphones for each loudspeaker is one of in a same plane relative to other loudspeakers or in a different plane for at least one of the loudspeakers relative to the other loudspeakers based at least on angles for the plurality of loudspeakers.

11. The method of claim 9, further comprising determining that any one or more of the plurality of loudspeakers correspond to an outlier which is indicative of the loudspeaker providing erroneous angle information or an obstruction that is present proximate to the loudspeaker based at least on the angle information exceeding a predetermined threshold.

12. The method of claim 11 further comprising prompting, via the mobile device, a user to move the obstruction positioned proximate to the loudspeaker that is determined to be the outlier.

13. The method of claim 9 further comprising selecting one loudspeaker of the plurality of loudspeakers as a reference loudspeaker and arbitrarily selecting reference coordinates for the other loudspeakers relative to the reference loudspeaker.

14. The method of claim 13 further comprising determining estimated distance coordinates for each of the other loudspeakers based at least on the angle information and the reference coordinates.

15. The method of claim 14 further comprising extending candidate coordinate estimates for at least one loudspeaker of the plurality of loudspeakers and providing an extended angle to provide an intersection between at least two of the loudspeakers.

16. The method of claim 15 further comprising determining an error based at least on the extended candidate coordinate estimates and, on an angle, based on the extended coordinate estimates to select a final candidate for the location of the at least one loudspeaker.

17. An audio system comprising:

a plurality of loudspeakers capable of being positioned in a listening environment and being arranged to transmit an audio signal in the listening environment, each loudspeaker being programmed to determine angle information of the audio signal as received at the loudspeaker relative to other loudspeakers of the plurality of loudspeakers and to transmit a first signal indicative of the angle information; and a primary loudspeaker programmed to receive the first signal from each of the loudspeakers and to determine a location for each loudspeaker in the listening environment based at least on the angle information, wherein each loudspeaker of the plurality of loudspeakers includes at least two microphones positioned thereon and being spaced apart from one another to receive the audio signal from the other loudspeakers of the plurality of loudspeakers, and wherein the primary loudspeaker is further programmed to store the angle information and to determine an orientation of the at least two microphones for each loudspeaker relative to one another based at least on the angle information.

* * * * *